United States Patent
Sumitomo et al.

(10) Patent No.: US 11,890,543 B2
(45) Date of Patent: Feb. 6, 2024

(54) STORAGE MEDIUM, INFORMATION PROCESSING APPARATUS, INFORMATION PROCESSING SYSTEM, AND GAME PROCESSING METHOD

(71) Applicants: Katsuyoshi Sumitomo, Kai (JP); Tatsuya Kamiyama, Kai (JP)

(72) Inventors: Katsuyoshi Sumitomo, Kai (JP); Tatsuya Kamiyama, Kai (JP)

(73) Assignees: Nintendo Co., Ltd., Kyoto (JP); HAL LABORATORY, INC., Tokyo (JP)

( * ) Notice: Subject to any disclaimer, the term of this patent is extended or adjusted under 35 U.S.C. 154(b) by 0 days.

(21) Appl. No.: 17/858,595

(22) Filed: Jul. 6, 2022

(65) Prior Publication Data

US 2023/0072022 A1 Mar. 9, 2023

(30) Foreign Application Priority Data

Sep. 8, 2021 (JP) .................. 2021-146246

(51) Int. Cl.
*A63F 13/56* (2014.01)
*A63F 13/573* (2014.01)

(52) U.S. Cl.
CPC ............ *A63F 13/56* (2014.09); *A63F 13/573* (2014.09)

(58) Field of Classification Search
CPC .......... A63F 13/40; A63F 13/42; A63F 13/45; A63F 13/50; A63F 13/525; A63F 13/5258; A63F 13/55; A63F 13/56
See application file for complete search history.

(56) References Cited

U.S. PATENT DOCUMENTS

| | | | |
|---|---|---|---|
| 6,746,331 B1 * | 6/2004 | Saikawa | A63F 13/10 463/31 |
| 10,518,179 B2 * | 12/2019 | Sogabe | A63F 13/573 |
| 10,537,800 B2 * | 1/2020 | Ito | A63F 13/537 |
| 2010/0160045 A1 * | 6/2010 | Yamada | A63F 13/52 463/43 |
| 2020/0078683 A1 * | 3/2020 | Anabuki | A63F 13/42 |

FOREIGN PATENT DOCUMENTS

JP 2011-210019 10/2011
JP 5289031 9/2013

* cited by examiner

*Primary Examiner* — Omkar A Deodhar
(74) *Attorney, Agent, or Firm* — Nixon & Vanderhye PC

(57) ABSTRACT

An example of an information processing system controls an action by a player character object in a virtual space in response to an action instruction based on an operation input. When the player character object performs the action, the information processing system defines a hit detection area used for defining whether the action has hit another object other than the player character object at a position that is determined based on the position and the orientation of the player character object in the virtual space, and expands the hit detection area in the depth direction of a virtual camera. If the expanded hit detection area is in contact with the other object, the information processing system performs a process based on the action against the other object.

40 Claims, 19 Drawing Sheets

STORAGE MEDIUM, INFORMATION PROCESSING APPARATUS, INFORMATION PROCESSING SYSTEM, AND GAME PROCESSING METHOD

CROSS REFERENCE TO RELATED APPLICATION

This application claims priority to Japanese Patent Application No. 2021-146246, filed on Sep. 8, 2021, the entire contents of which are incorporated herein by reference.

FIELD

The present disclosure relates to a storage medium, an information processing apparatus, an information processing system and a game processing method for performing hit detection for objects in a virtual space.

BACKGROUND AND SUMMARY

Techniques for determining whether an object has hit another object in a virtual space have been known in the art. One method for performing such hit detection is a method in which a hit detection area is defined for an object, for example.

With a three-dimensional virtual space, it may be difficult for the user to accurately grasp the position of the object for the depth direction of the virtual space displayed on the screen. Therefore, when the user controls an object so as to perform an action to hit another object, it is difficult to determine whether the positions of these two objects are shifted from each other in the depth direction, and it may be difficult to perform the action to hit the other object.

Thus, the present application discloses a storage medium, an information processing apparatus, an information processing system and a game processing method, with which it is easier to perform an action to hit an object even when positions of objects are shifted from each other for the depth direction.

(1)
An example of a storage medium disclosed herein stores a game program for causing a processor of an information processing apparatus to perform the following processes.
controlling a virtual camera in a virtual space.
controlling movement of a player character object in the virtual space in response to a move instruction based on an operation input by a user.
controlling an action by the player character object in the virtual space in response to an action instruction based on the operation input.
when the player character object performs the action, defining a hit detection area in virtual space used for determining whether the action has hit another object other than the player character object at a position that is determined based on position and orientation of the player character object in the virtual space, and expanding the hit detection area in a depth direction of the virtual camera.
if the expanded hit detection area is in contact with the other object, performing a process based on the action against the other object.

With configuration (1) above, as the hit detection area is expanded in the depth direction of the virtual camera, even if the positions of the objects are shifted from each other in the depth direction of the virtual camera, it is easier to perform the action to hit the object.

(2)
The hit detection area may be a plurality of areas of a predetermined shape that are arranged in a predetermined positional relationship. The game program causes the processor to: expand the hit detection area by adding, to at least one of the plurality of areas, an area of the same shape as the at least one area at a position that is shifted by a predetermined amount in the depth direction of the virtual camera.

With configuration (2) above, it is possible to easily define additional areas by changing the position of the reference area, it is possible to easily expand the hit detection area.

(3)
The game program may cause the computer processor to expand the hit detection area by adding, to at least one of the plurality of areas, an area on a near side thereof in the depth direction of the virtual camera and an area on a far side thereof in the depth direction of the virtual camera.

With configuration (3) above, it is easier to perform the action to more reliably hit the object.

(4)
The hit detection area may be a plurality of areas of a predetermined shape that are arranged in a predetermined positional relationship. The game program may cause the processor to expand the hit detection area by moving at least one of the plurality of areas in the depth direction of the virtual camera.

With configuration (4) above, it is possible to easily expand the hit detection area by moving the reference area.

(5)
The game program may cause the computer processor to expand the hit detection area by deforming the hit detection area so as to enlarge the hit detection area in the depth direction of the virtual camera.

With configuration (5) above, it is possible to expand the hit detection area by deforming the hit detection area.

(6)
The hit detection area may have a spherical shape.
With configuration (6) above, it is easy to manage the hit detection area and to perform the determination using the hit detection area.

(7)
The hit detection area may have a shape that includes a first unit area and a second unit area that are arranged in a predetermined positional relationship, and a connecting area that connects together the first unit area and the second unit area by a predetermined rule.

With configuration (7) above, it is possible to use a hit detection area whose shape is not simple.

(8)
The game program may cause the computer processor to: in response to the action instruction, start a control of the action by the player character object, and define the hit detection area based on position and orientation of the player character object in the virtual space; and for a predetermined period of time after the start of the action, continue the control of the action by the player character object, and update the hit detection area in accordance with passage of time. Updating the hit detection area in accordance with passage of time may be done by updating the hit detection area in accordance with passage of time based on a pattern that is associated with the action, and expanding the updated hit detection area in the depth direction of the virtual camera.

With configuration (8) above, even if the un-expanded hit detection area dynamically changes, the expansion of the hit detection area can be done precisely in response to changes.

(9)

The other object may be an enemy character object. The predetermined action may be an attack action. The process based on the action may be a process of giving a damage to the enemy character object.

With configuration (9) above, it is easier to make an attack action by the enemy character hit an object, and it is possible to improve the controllability of the attack action.

(10)

The game program may cause the computer processor to further: control the enemy character object in the virtual space; if an enemy attack action is performed in which the enemy character object attacks the player character object based on the control of the enemy character object, define an enemy hit detection area used for determining whether the enemy attack action has hit the player character object based on position and orientation of the enemy character object in the virtual space, without expanding the enemy hit detection area in the depth direction of the virtual camera; and if the enemy hit detection area is in contact with the player character object, perform a process of giving a damage to the player character object.

With configuration (10) above, it is possible to reduce the amount of computation for the process of expanding the hit detection area and the process of hit detection.

Note that the present specification discloses an information processing apparatus or an information processing system capable of executing the processes of configurations (1) to (10) above. The present specification also discloses a game processing method capable of executing the processes of configurations (1) to (10) above.

With the storage medium, the information processing apparatus, the information processing system and the game processing method described above, it is easier to make an action hit an object.

These and other objects, features, aspects and advantages of the present invention will become more apparent from the following detailed description of the present invention when taken in conjunction with the accompanying drawings.

DETAILED DESCRIPTION OF NON-LIMITING EXAMPLE EMBODIMENTS

[1. Configuration of Game System]

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
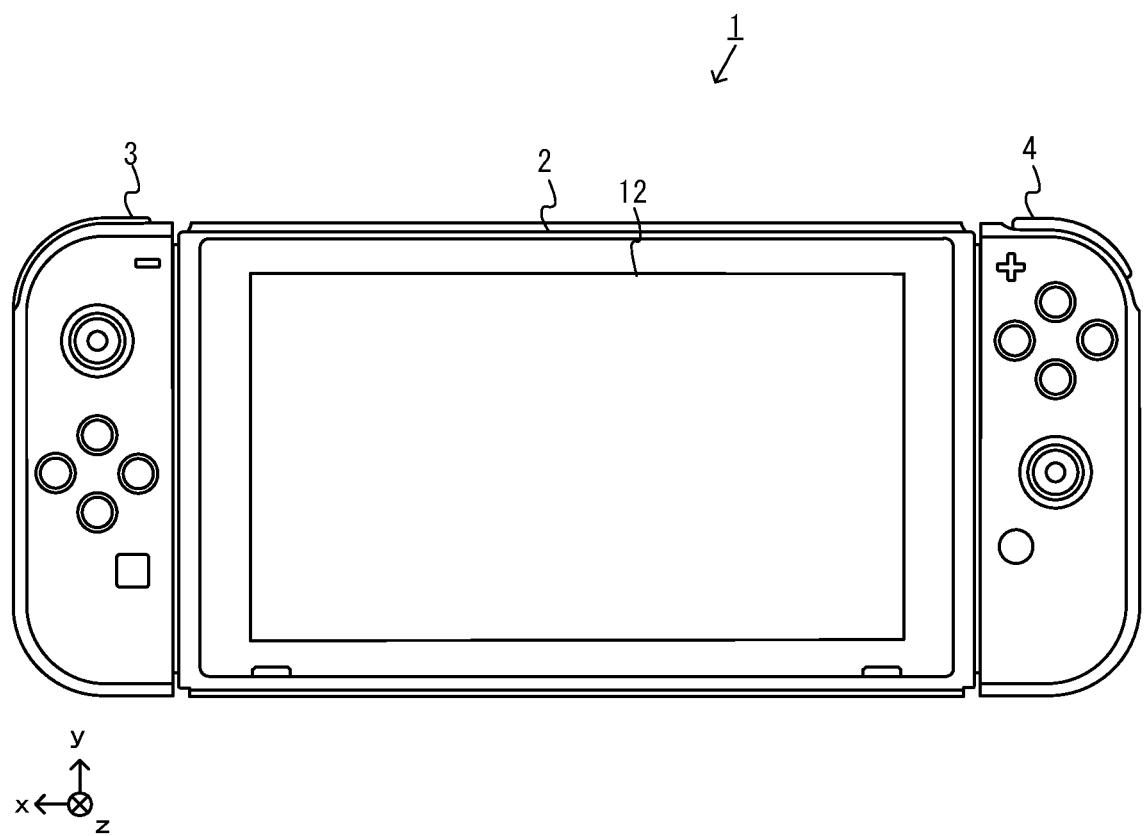
FIG. 1 is a view showing an example where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
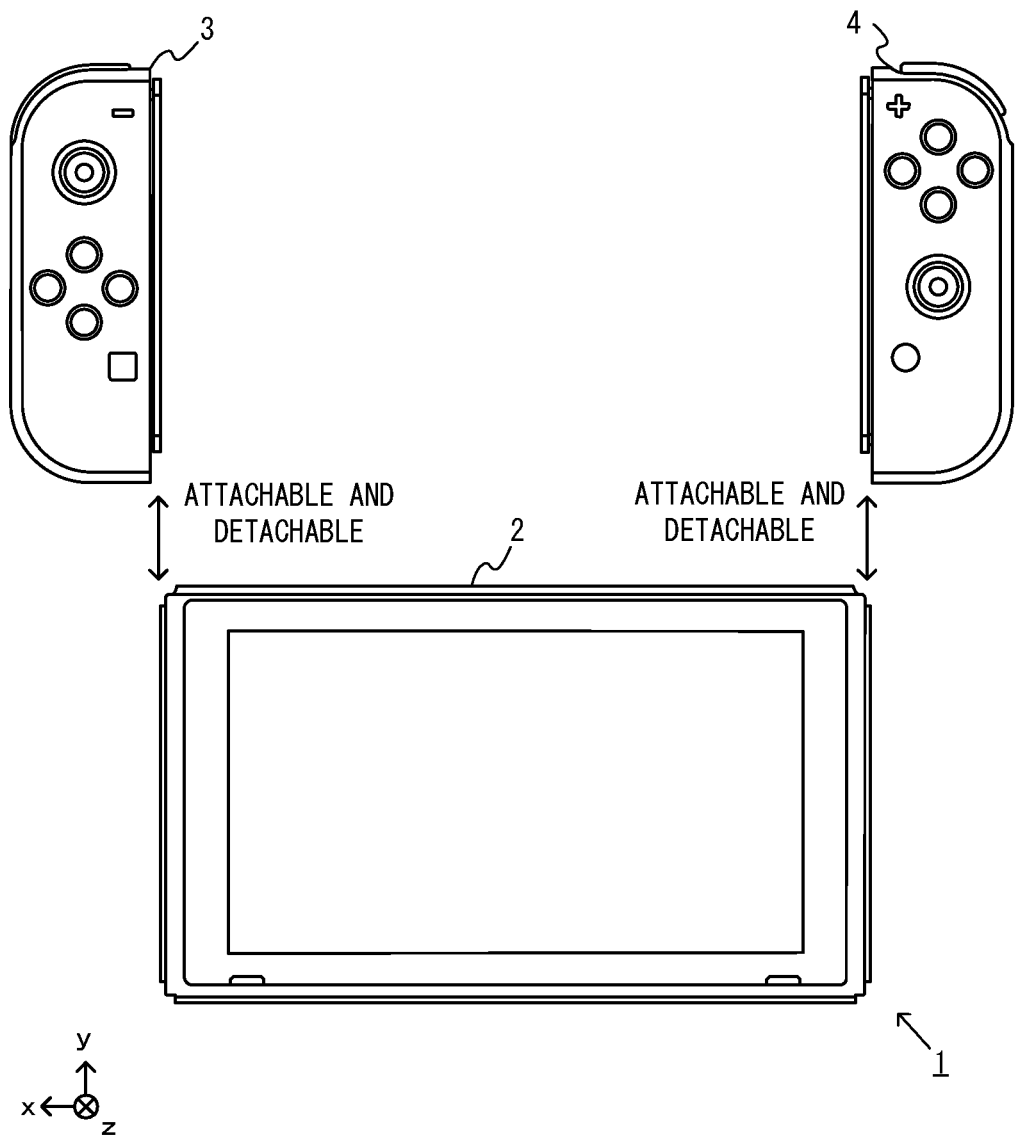
FIG. 2 is a view showing an example where a non-limiting left controller and a non-limiting right controller are removed from a non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
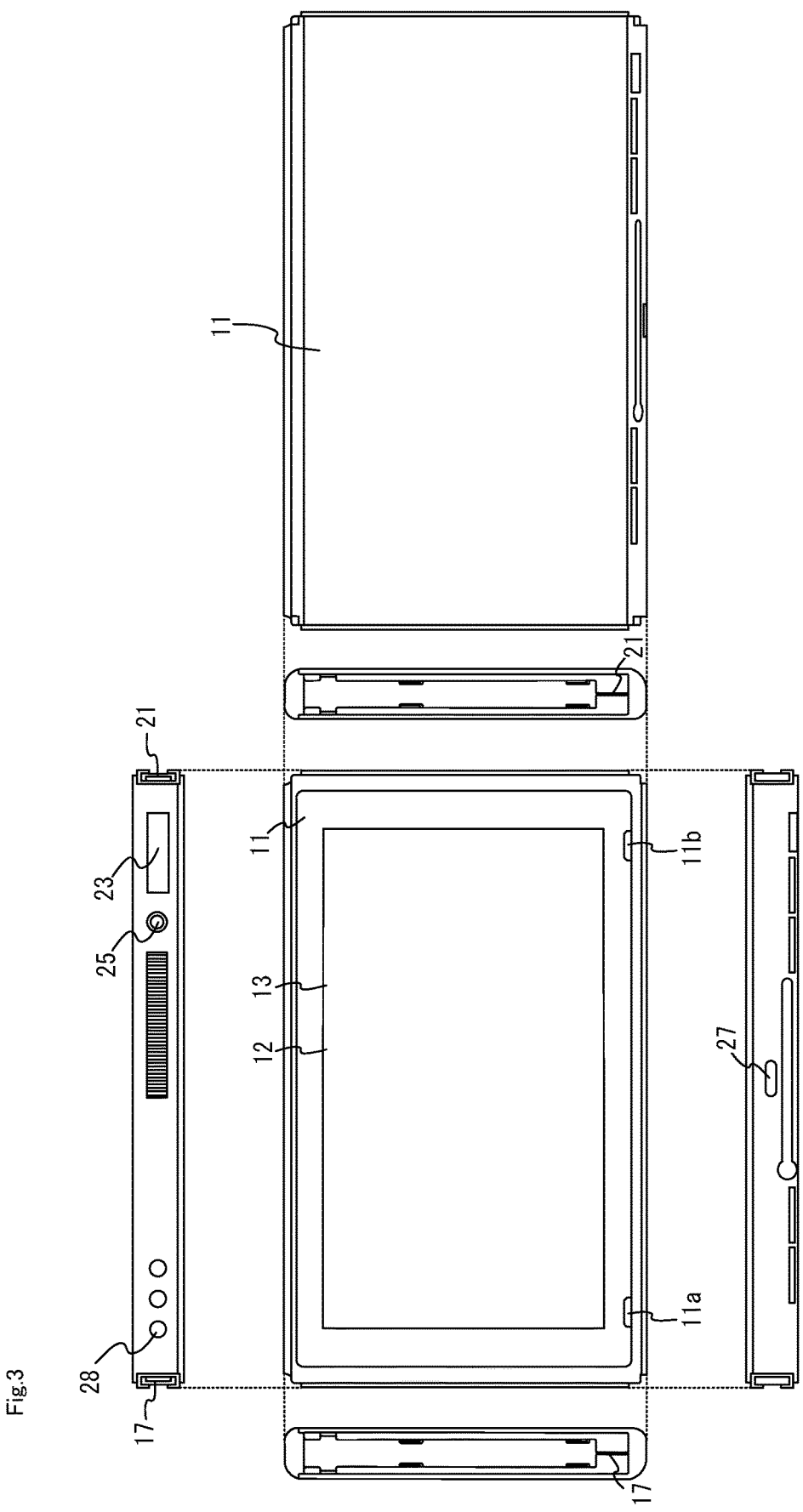
FIG. 3 is a six-sided view showing an example of a non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
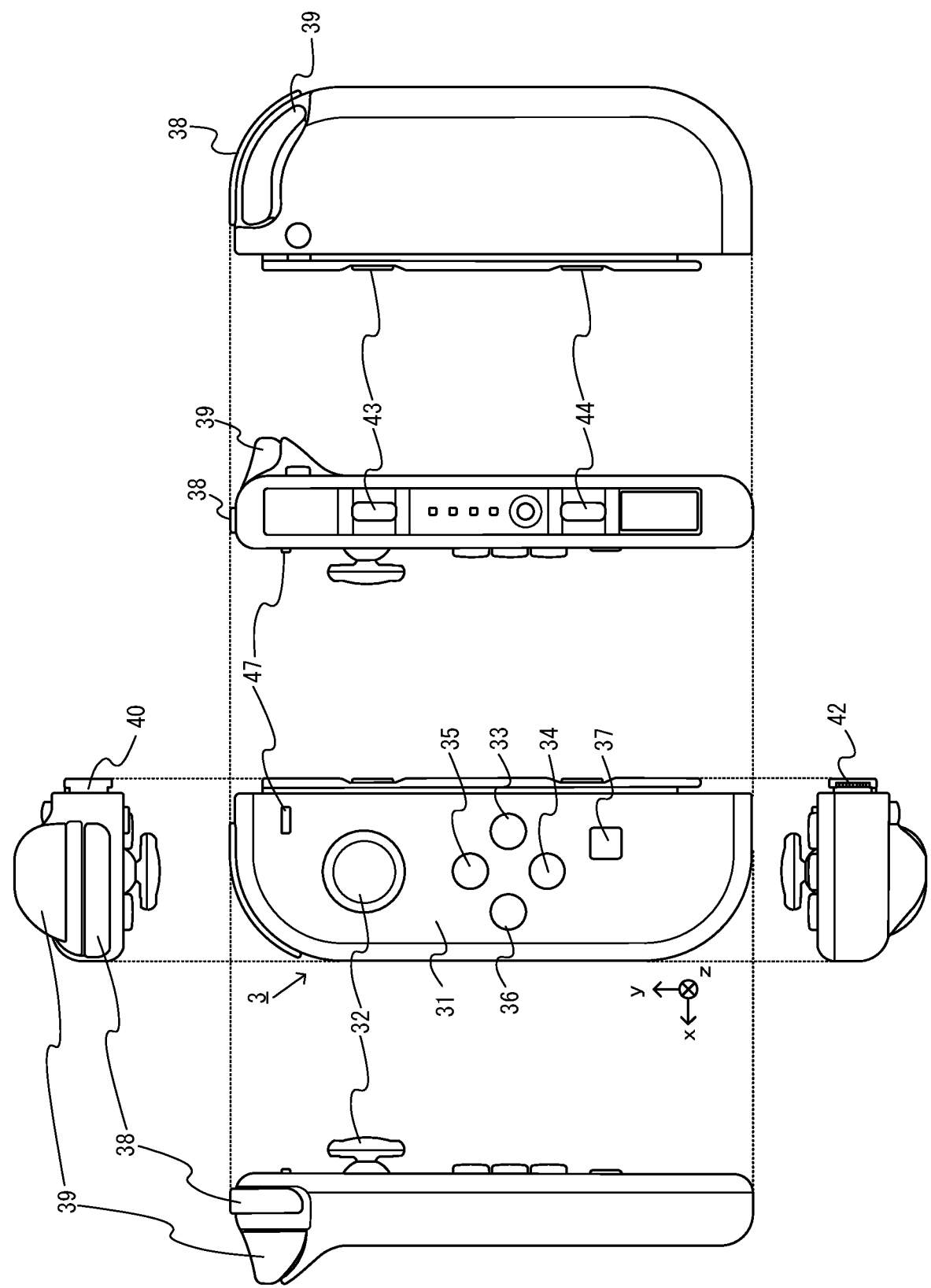
FIG. 4 is a six-sided view showing an example of a non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
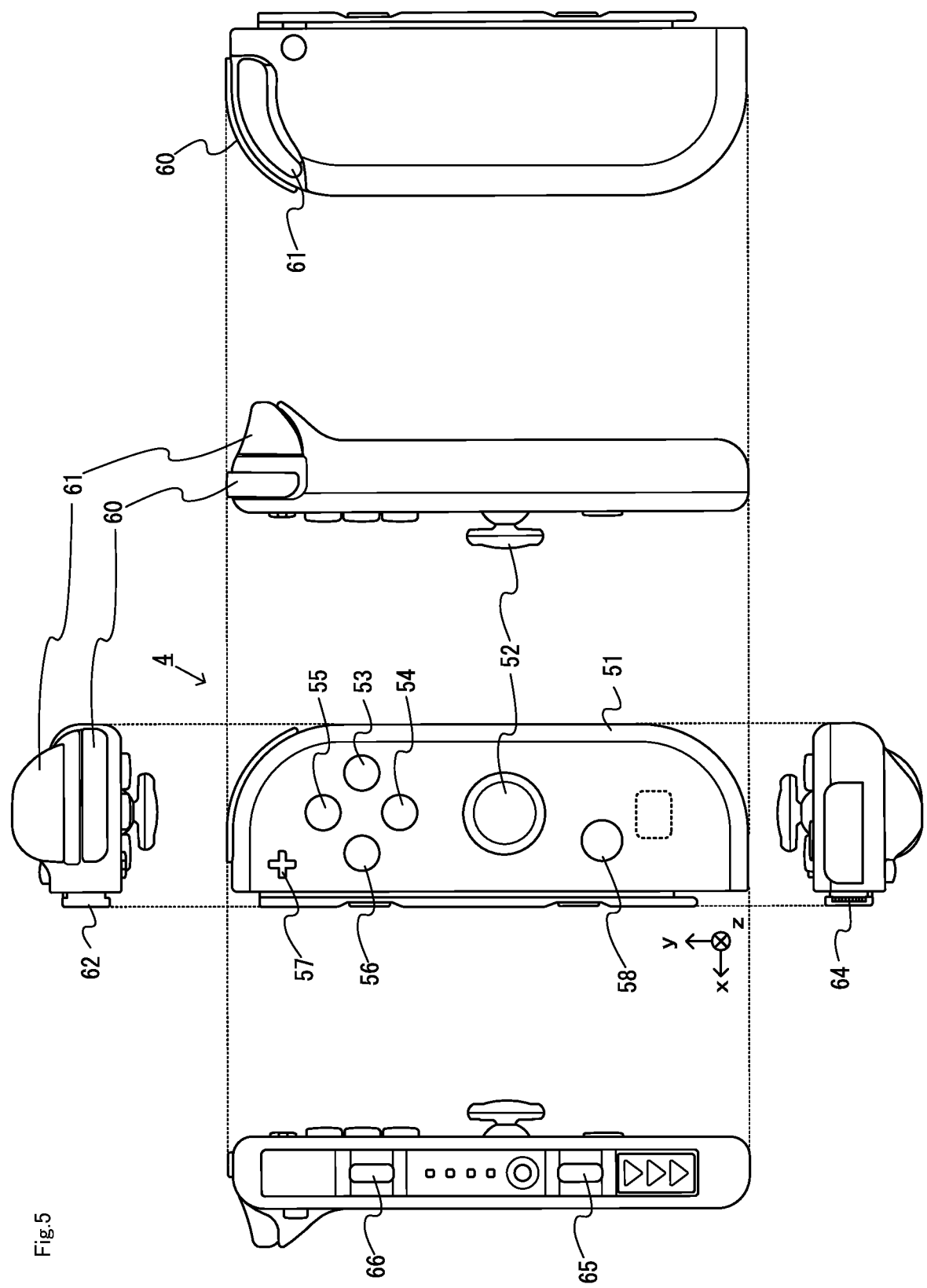
FIG. 5 is a six-sided view showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
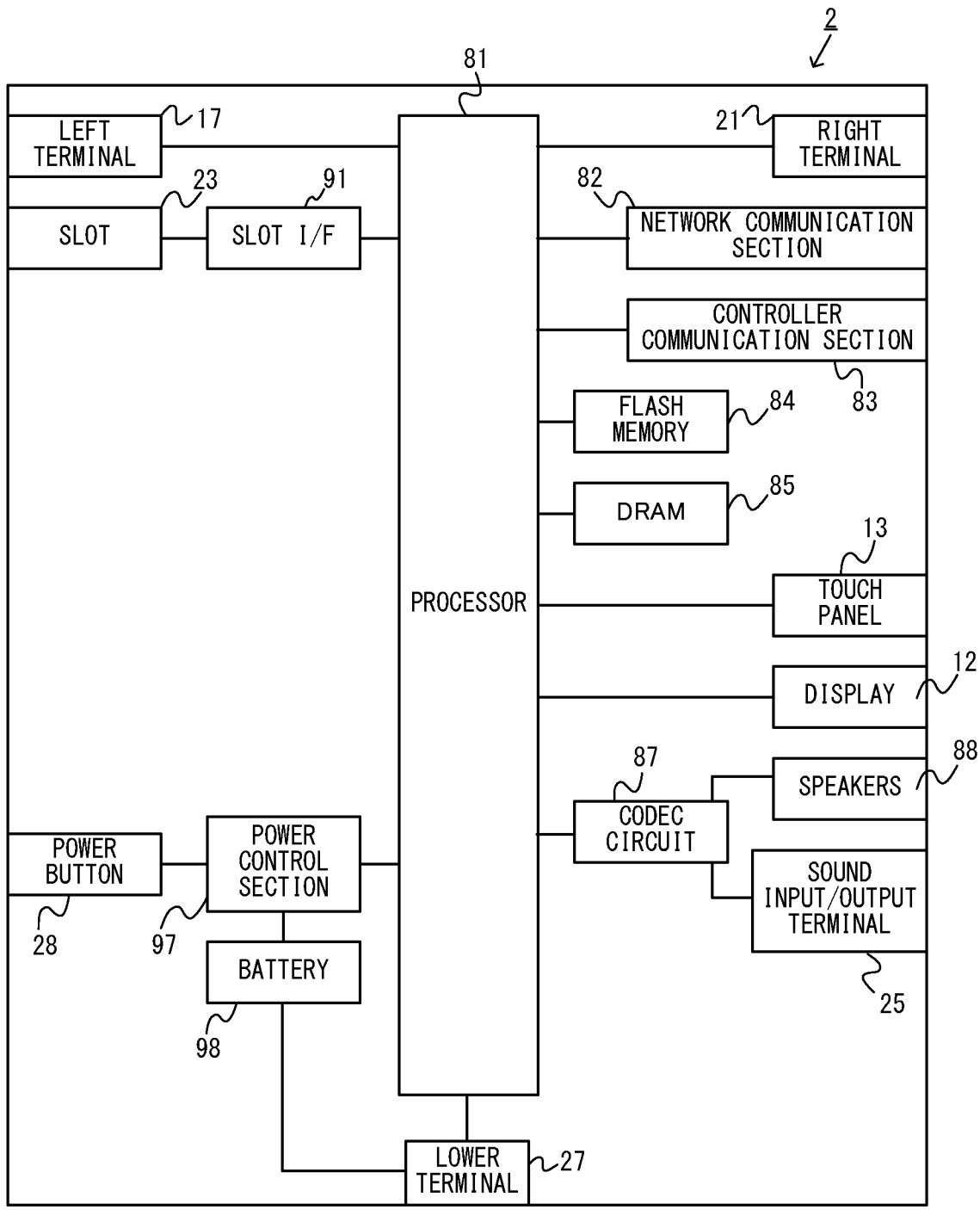
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81 to 85, 87, 88, 91, 97, and 98 shown in FIG. 6 in addition to the components shown in FIG. 3. Some of the components 81 to 85, 87, 88, 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
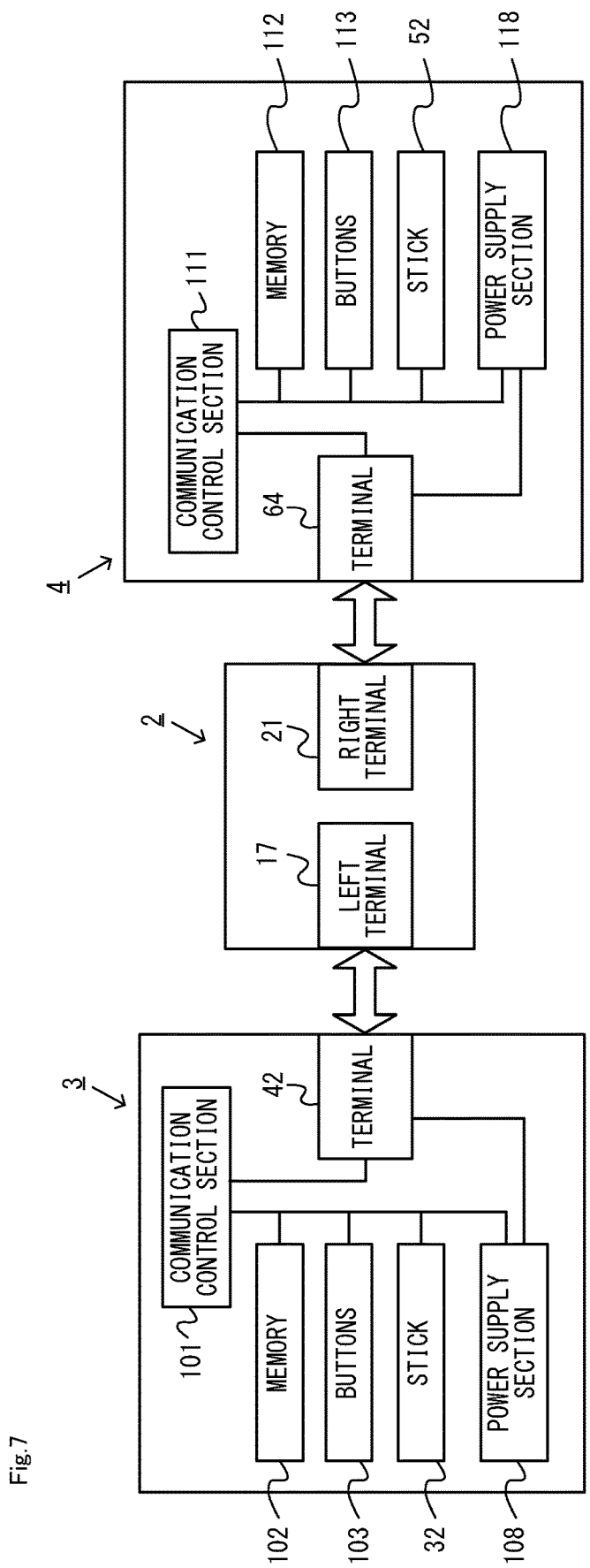
FIG. 7 is a block diagram showing an example of an internal configuration of a non-limiting main body apparatus, a non-limiting left controller and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[2. Outline of Process Performed on Game System]

Next, referring to FIG. 8 to FIG. 16, the process to be executed on the game system 1 will be outlined. In the present embodiment, the game system 1 controls the action of a player character object (hereinafter referred to simply as the "player character"), which is an object to be controlled by the user (referred to also as the player) of the game system 1, in the virtual space (referred to also as the game space). In response to an action by the player character, the game system 1 performs hit detection for that action. Specifically, in the present embodiment, the action is an attack action against an enemy character object (hereinafter referred to simple as the "enemy character"), and the game system 1 determines whether the attack action has hit the enemy character. Note that in other embodiments, the action is not limited to an attack action but may be any action (see "[4. Functions/effects and variations of present embodiment]" to be described below).

The hit detection area is used for the determination described above. That is, the game system 1 defines the hit detection area in the game space for an attack action, and determines that the attack action has hit an enemy character if at least a part of the enemy character is included in the hit detection area. On the other hand, if the enemy character is not included in the hit detection area, the game system 1 determines that the attack action has not hit the enemy character.

In the present embodiment, the player character is able to perform a plurality of kinds of attack actions. While there is no limitation on the attack actions, the method of defining the hit detection area will now be described for three kinds of attack actions, e.g., an attack action of swinging a sword (hereinafter referred to as the "sword action"), an attack action of swinging a hammer (hereinafter referred to as the "hammer action"), and an attack action of throwing a cutter (hereinafter referred to as the "cutter action").

Figure 8:
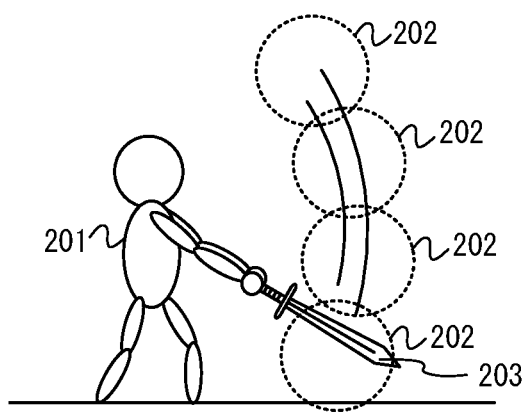
FIG. 8 is a view showing an example of a player character performing a sword action and the hit detection area that is defined during the action.

FIG. 8 is a view showing an example of the player character performing the sword action and the hit detection area that is defined during the action. When an attack action is performed, the game system 1 defines hit detection areas 202 (four hit detection areas 202 in FIG. 8) based on the position and the orientation of a player character 201 performing the attack action. Specifically, when the player character 201 performs the sword action, the game system 1 defines hit detection areas 202 at positions including the path of a sword object 203 as shown in FIG. 8.

Figure 9:
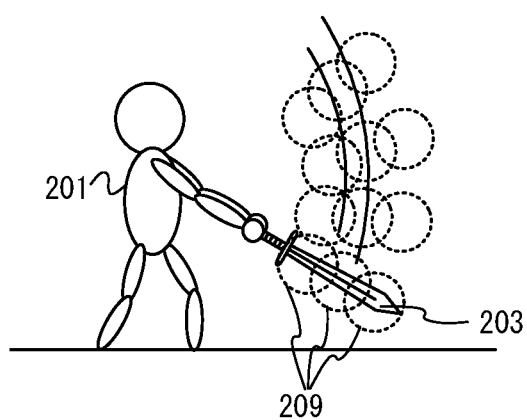
FIG. 9 is a view showing another example of a player character performing a sword action and the hit detection area that is defined during the action.

Note that although the details will be described below, in the present embodiment, the game system 1 expands the hit detection areas. Hereinafter, original hit detection areas to be expanded will be referred to as the "reference areas". In the example shown in FIG. 8, four spherical areas 202 are defined as reference areas. Note that there is no limitation on the shape and the number of reference areas (referred to also as hit detection areas) defined for a single attack action. For example, areas 209 may be defined for different parts, e.g., the base, the middle and the tip, of the sword as shown in FIG. 9 so that the elongate shape of the sword object 203 is covered by a plurality of (three in the example shown in FIG. 9) areas 209. Note that in the example shown in FIG. 9, three areas 209 are defined so as to cover the area conforming to the shape of the sword object 203 as hit detection areas, and four sets of hit detection areas, each set including the three areas 209 (i.e., a total of 12 hit detection areas), are defined as reference areas so as to cover the area conforming to the swing path of the sword object 203 as hit detection areas. Although the details will be described below, in the present embodiment, the game system 1 defines the number and the shape of reference areas in accordance with the type of the attack action so that the reference areas are arranged in a positional relationship (referred to also as the arrangement pattern) in accordance with the type of the attack action.

As described above, since original hit detection areas to be expanded are spherical, the game system 1 can manage these areas with two parameters, i.e., the center position and the radius, and it is possible to easily perform hit detection.

In the present embodiment, for the sword action, the game system 1 defines the four reference areas 202 simultaneously (i.e., in one frame). Over a period in which the sword action is performed, the game system 1 continuously defines the four reference areas 202. Note that the four reference areas 202 do not move during the sword action.

Note that when a plurality of reference areas are defined simultaneously, the game system 1 may define the reference areas so that one or more of the reference areas overlap with the other reference area or reference areas (see FIG. 8). Then, it is possible to reduce the possibility that another object arranged on the path of the attack action (e.g., the path of the sword) may not be included in the hit detection areas, thereby erroneously determining that the attack action has not hit the other object.

Figure 10:
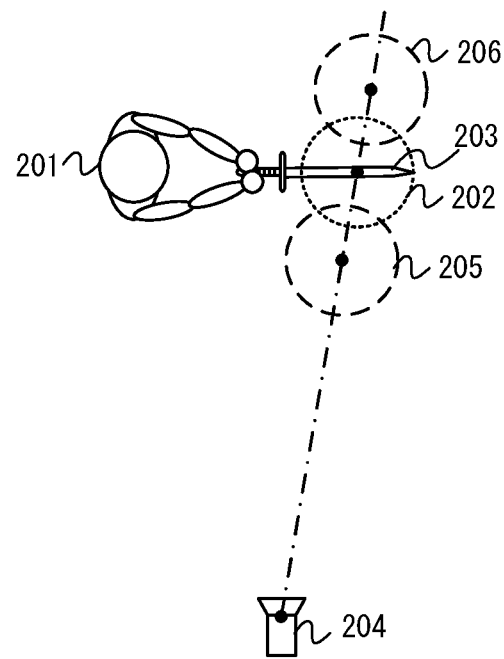
FIG. 10 is a view showing an example of the player character shown in FIG. 8 and the hit detection area as the game space is viewed from above.

FIG. 10 is a view showing an example of the player character shown in FIG. 8 and the hit detection area as the game space is viewed from above. In the example shown in FIG. 10, a virtual camera 204 for generating the game image is arranged sideward of the player character 201. Note that FIG. 10 shows only one of the four reference areas 202 defined for the sake of simplicity of the drawing, and shows only some of additional areas, to be described below, that are defined based on the reference area shown.

In the present embodiment, the game system 1 expands the hit detection area. Specifically, the game system 1 expands the hit detection area by setting additional areas 205 and 206 at positions that are shifted from the reference area 202 in the depth direction (the direction of the one-dot-chain line shown in FIG. 10) of the virtual camera 204. Note that the size and the shape of the additional areas 205 and 206 are the same as the size and the shape of the reference area 202. Such an expansion method can be said to be a method of expanding the hit detection area by moving the reference area 202 in the depth direction. The expanded hit detection area is an area that is included at least one of the reference area 202 and the additional areas 205 and 206.

As described above, by expanding the hit detection area in the depth direction of the virtual camera 204, it is more likely to be determined that the attack action has hit an enemy character even if the position at which the attack action is performed and the position of the enemy character are shifted from each other in the depth direction. Thus, even if it is difficult for the user to accurately grasp the position of the enemy character in the depth direction, it is made easier for the user to perform the attack action to hit the enemy character. Therefore, it is possible to improve the controllability of the attack action.

Note that in the present embodiment, the game system 1 expands the hit detection area by adding the additional areas 205 and 206 having the same shape as the reference area 202 at positions that are shifted in the depth direction of the virtual camera (in other words, expands the hit detection area by moving the reference area 202 in the depth direction of the virtual camera). Then, since the game system 1 can easily define the additional areas 205 and 206 by the process of changing the position of the reference area 202, it is possible to easily perform the expansion process.

Note that although not shown in FIG. 10, the game system 1 expands each of the four reference areas 202 by defining additional areas for each of the four reference areas 202. Note however that in other embodiments, where a plurality of reference areas are defined, the game system 1 does not need to expand all the reference areas but may expand at least one or more of the reference areas. For example, consider a case where a plurality of reference areas are arranged in a ring shape, and another reference area is further arranged at the center of the reference areas arranged in a ring shape. In this case, whether or not to expand the reference area arranged at the center, there will be no significant change to the expanded hit detection area as a whole. Therefore, for example, in this case, there is no need to expand the reference area arranged at the center.

As shown in FIG. 10, in the present embodiment, the additional areas 205 and 206 are defined so that the centers of the additional areas are located on the straight line that passes through the position of the virtual camera 204 and the center of the reference area 202. Then, as viewed from the position of the virtual camera 204, there is substantially no change to the (apparent) extent of the hit detection area even if expanded. Therefore, the game system 1 can expand the hit detection area without causing the user to feel awkward.

In the present embodiment, the game system 1 defines the additional area 205 on the near side and the additional area 206 on the far side, relative to the reference area 202, in the depth direction of the virtual camera 204. Thus, the game system 1 expands the hit detection area by adding an additional area both on the near side and on the far side in the depth direction of the virtual camera 204. Then, whether the position at which the attack action is performed is shifted on the near side or on the far side relative to the position of the enemy character, it is more likely to be determined that the attack action has hit the enemy character. Therefore, in either case, it is easier for the user to perform the attack action to hit the enemy character, and it is possible to perform the attack action to more reliably hit the enemy character.

Note that in other embodiments, the game system 1 may expand the hit detection area only on the near side or on the far side in the depth direction of the virtual camera relative to the reference area. For example, in a game in which the player character primarily proceeds toward the far side in the depth direction of the virtual camera, the enemy character is often present on the far side relative to the player character 201. Therefore, in such a game, the game system 1 may define the additional area only on the far side in the depth direction relative to the reference area. Then, the game system 1 can reduce the number of additional areas and reduce the process load of the hit detection.

In the present embodiment, the additional areas 205 and 206 are defined at positions that are shifted, by a predetermined distance, from the reference area 202 (more specifically, the center of the reference area 202) in the depth direction of the virtual camera 204. The predetermined distance may be determined based on the size of the player character 201. For example, the predetermined distance is determined to a half of the size of the player character 201 (e.g., the width of the player character 201). Note that while the predetermined distance is determined to be an equal length on the near side and on the far side in the depth direction of the virtual camera 204 in the present embodiment, the predetermined distance may be determined to be different lengths on the near side and on the far side in other embodiments.

In the present embodiment, each additional area is defined so as to partially overlap with the reference area corresponding to the additional area (see FIG. 10). Then, there will be no gap between the reference area and an additional area defined based on the reference area, and it is possible to reduce the possibility that when an enemy character is present in this gap, the attack action is erroneously determined to have not hit the enemy character.

Figure 11:
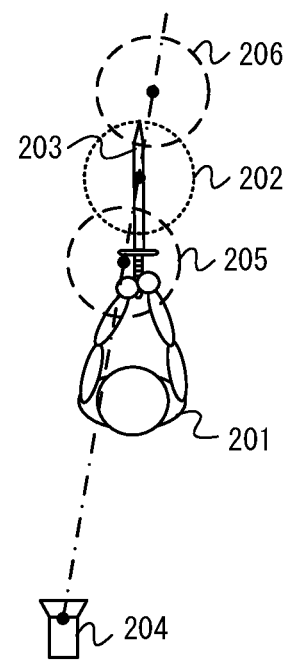
FIG. 11 is a view showing another example of the player character shown in FIG. 8 and the hit detection area as the game space is viewed from above.

FIG. 11, as is FIG. 10, is a view showing another example of the player character shown in FIG. 8 and the hit detection area as the game space is viewed from above. As opposed to FIG. 10, FIG. 11 shows an example where the virtual camera 204 is arranged reward of the player character 201.

Also in the case shown in FIG. 11, as in the case shown in FIG. 10, the game system 1 defines the additional areas 205 and 206 at positions that are shifted by the predetermined distance in the depth direction of the virtual camera 204 relative to the reference area 202. Therefore, also in the case shown in FIG. 11, as in the case shown in FIG. 10, the hit detection area is expanded, thereby realizing similar advantageous effects to those of the case shown in FIG. 10. Thus, in the present embodiment, the hit detection area is expanded in the depth direction of the virtual camera 204 irrespective of the position and the orientation of the player character 201 relative to the virtual camera 204. This realizes an advantageous effect that it is easier to perform the attack action to hit the enemy character, irrespective of the position and the orientation of the player character 201.

Figure 12:
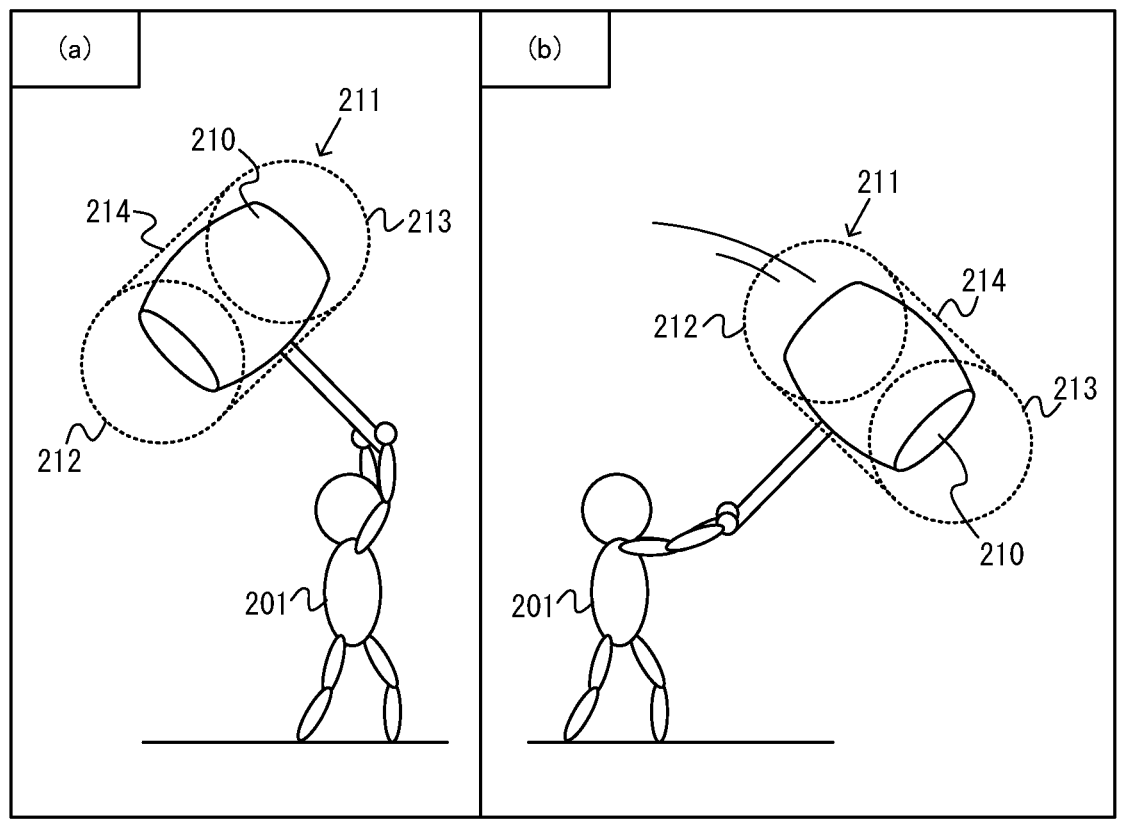
FIG. 12 is a view showing an example of a player character performing a hammer action and the hit detection area that is defined during the action.

FIG. 12 is a view showing an example of the player character performing a hammer action and the hit detection area that is defined during the action. The state (a) shown in FIG. 12 is a state at a point in time when the player character 201 starts swinging the hammer, and the state (b) shown in FIG. 12 is a state at a point in time when some time has elapsed since the state (a).

Also with the hammer action, as with the sword action, the game system 1 defines the hit detection area based on the position and the orientation of the player character 201 performing the attack action. Here, when the hammer action is performed, the game system 1 defines a reference area 211 in the vicinity of the position of the head of the hammer object 210 as shown in FIG. 12. Note that with the hammer action, as opposed to the sword action, the reference area 211 is defined so as to move in accordance with the movement of the hammer object 210 during the attack action. That is, the reference area 211 moves during the hammer action (see FIG. 12).

In the present embodiment, with the hammer action, there is one reference area that is defined simultaneously (specifically, defined in one frame). Note however that also with the hammer action, as with the sword action, a plurality of reference areas may be defined simultaneously.

In the present embodiment, the reference area 211 during the hammer action has a capsule shape (in other words, a columnar shape) as opposed to the sword action. The game system 1 defines the so-shaped reference area 211 based on a first unit area 212 and a second unit area 213, which are spherical. Specifically, the game system 1 defines, as the reference area 211, the first unit area 212, the second unit area 213, and a connecting area 214 that connects together the two unit areas 212 and 213 (see FIG. 12). Note that in the present embodiment, a connecting area 214 is the path of the first unit area 212 if the first unit area 212 were to move straight to the second unit area 213. As described above, in the present embodiment, the game system 1 can easily define a non-spherical reference area 211 based on the spherical unit areas 212 and 213.

Thus, in the present embodiment, the size and the shape of the reference area may differ depending on the kind of the attack action, and may be determined appropriately depending on the attack action.

Figure 13:
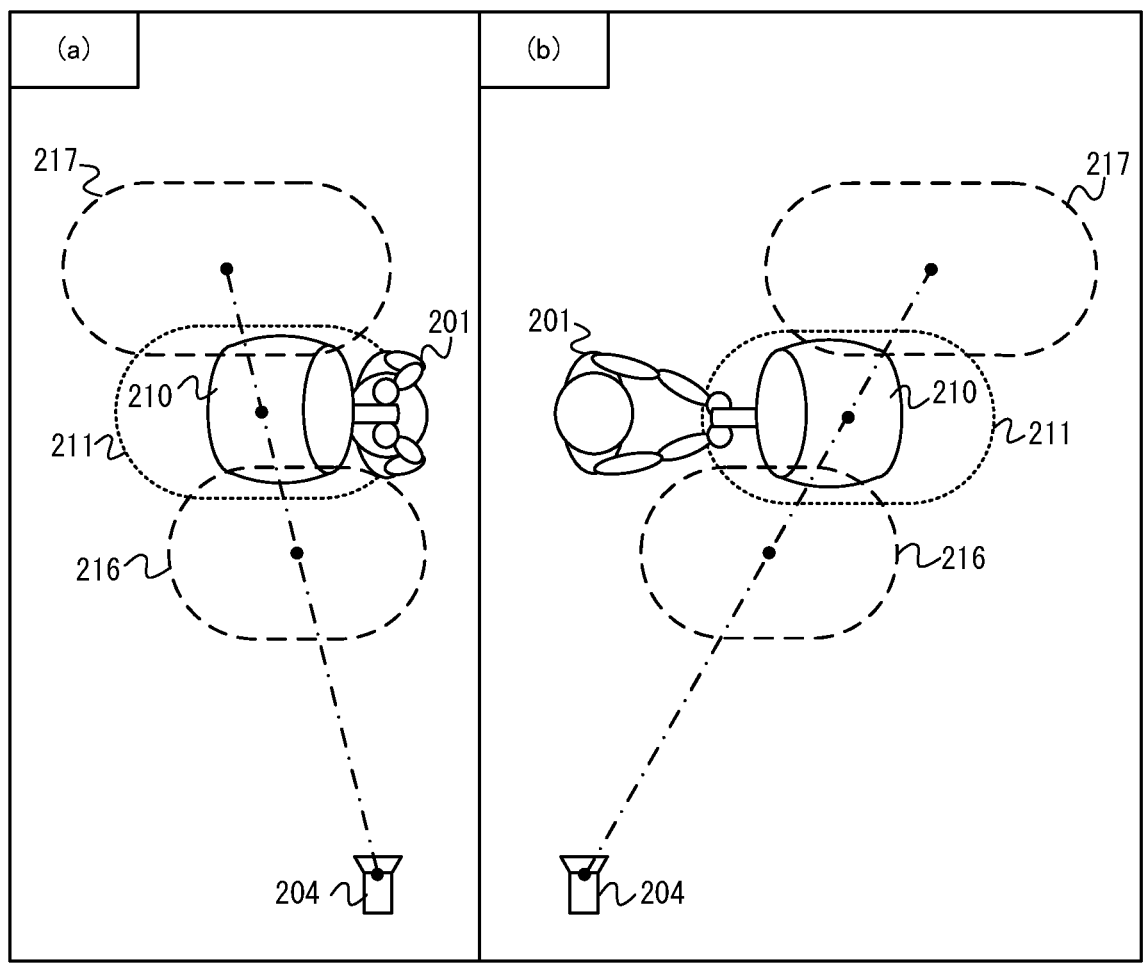
FIG. 13 is a view showing an example of the player character shown in FIG. 12 and the hit detection area as the game space is viewed from above.

FIG. 13 is a view showing an example of the player character shown in FIG. 12 and the hit detection area as the game space is viewed from above. The state (a) shown in FIG. 13 is a state at the same point in time as the state (a) shown in FIG. 12, and the state (b) shown in FIG. 13 is a state at the same point in time as the state (b) shown in FIG. 12. In the example shown in FIG. 13, the virtual camera 204 is arranged sideward of the player character 201.

Also with the hammer action as with the sword action, the game system 1 expands the hit detection area in the depth direction of the virtual camera 204. Specifically, as shown in FIG. 13, the game system 1 expands the hit detection area by defining the additional areas 216 and 217 at positions that are shifted from the reference area 211 in the depth direction of the virtual camera 204. While the detailed method of defining the additional areas 216 and 217 will be described below, the game system 1 defines the additional areas 216 and 217 so that the centers of the additional areas 216 and 217 are located on the straight line that connects together the position of the virtual camera 204 and the center of the reference area 211 (see FIG. 13). The general shape of each of the additional areas 216 and 217 is a capsule shape as is the reference area 211.

With the hammer action, the reference area 211 moves during the attack action as described above. Therefore, during the hammer action, the game system 1 defines the additional areas 216 and 217 based on the reference area 211 at the current time. That is, the additional areas 216 and 217 are defined on the near side and the far side in the depth direction of the virtual camera 204 relative to the reference area 211 at the current time (see FIG. 13).

Figure 14:
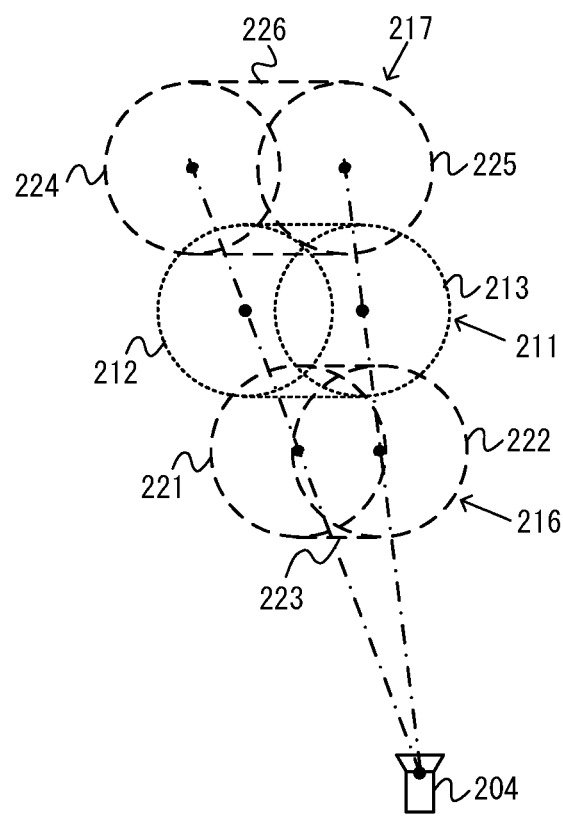
FIG. 14 is a view showing an example of a method of defining additional areas shown in FIG. 13.

FIG. 14 is a view showing an example of a method of defining additional areas shown in FIG. 13. In the present embodiment, the game system 1 defines the additional areas for the hammer action as follows. First, the game system 1 defines additional unit areas 221, 222, 224 and 225 at positions that are shifted in the depth direction of the virtual camera 204 from the unit areas 212 and 213 of the reference area 211. Specifically, the first additional unit area 221 is defined on the near side in the depth direction relative to the first unit area 212, and the second additional unit area 222 is defined on the near side in the depth direction relative to the second unit area 213. The third additional unit area 224 is defined on the far side in the depth direction relative to the first unit area 212, and the fourth additional unit area 225 is defined on the far side in the depth direction relative to the second unit area 213. Next, the game system 1 defines, as the additional area 216, two additional unit areas 221 and 222 defined on the near side of the reference area 211 and an additional connecting area 223 that connects together the additional unit areas 221 and 222. The game system 1 defines, as the additional area 217, two additional unit areas 224 and 225 defined on the far side of the reference area 211 and an additional connecting area 226 that connects together the additional unit areas 224 and 225. As described above, the additional areas 216 and 217 are defined based on the spherical additional unit areas 221, 222, 224 and 225. Note that since the additional areas 216 and 217 are defined as described above, the size and the shape of each of the additional areas 216 and 217 are slightly different from the size and the shape of the reference area 211 during the hammer action.

As described above, with the hammer action, the hit detection area to be expanded (i.e., the reference area 211) is an area that includes the first unit area 212 and the second unit area 213, which are arranged in a predetermined positional relationship, and includes the connecting area 214 that connects together the first unit area 212 and the second unit area 213 by a predetermined rule (see FIG. 12). The game system 1 expands the hit detection area by defining the first additional unit area 221 (or the third additional unit area 224) at a position that is shifted by a predetermined amount in the depth direction of the virtual camera 204 relative to the first unit area 212, defining the second additional unit area 222 (or the fourth additional unit area 225) at a position that is shifted by a predetermined amount in the depth direction of the virtual camera 204 relative to the second unit area 213, and adding, to the hit detection area, the additional area 217 including the first additional unit area 221, the second additional unit area 222, and the additional connecting area 226 that connects together the first additional unit area 221 and the second additional unit area 222 by the predetermined rule (see FIG. 14). Thus, even if the shape of the reference area is not a simple shape (e.g., a spherical shape) it is possible to easily define additional areas by defining the additional areas based on unit areas on which the reference area is based.

Note that the "predetermined rule" in the present embodiment is a rule that "the first unit area and the second unit area are connected straight". Here, in other embodiments, the predetermined rule may be any rule. For example, in other embodiments, the predetermined rule may be a rule that "the first unit area and the second unit area are linked together along the path of the head of the hammer object during the hammer action". By defining the additional connecting areas and the connecting area using the same rule, it is possible to easily define additional areas having the same or similar shape as the reference area, irrespective of the predetermined rule.

Note that while the size and the shape of each of the additional areas 216 and 217 are different from the size and the shape of the reference area 211 depending on the position in the depth direction in the example of the hammer action described above, additional areas whose size and/or shape are equal to those of the reference area 211 may be defined in other embodiments. That is, in other embodiments, irrespective of the shape of the reference area, the additional areas may have the same size and the same shape as the reference area, or may have the same shape as the reference area with the size thereof being adjusted.

Note that the distance from the reference area to an additional area (more specifically, the distance from the center of the reference area to the center of the additional area, i.e., the predetermined distance) in the hammer action is equal to that in the sword action. In the present embodiment, the game system 1 sets the predetermined distance to the same value irrespective of the kind of the attack action. Here, if the predetermined distance differs between different kinds of attack actions, the positional relationship (i.e., the positional relationship between the player character 201 and the enemy character) for the determination that the attack action has hit the enemy character will differ between different kinds of attack actions, thereby possibly making the user feel awkward. In contrast, in the present embodiment, it is possible to reduce such a possibility by using the same predetermined distance for different kinds of attack actions.

On the other hand, in the present embodiment, since the shape and the size of the reference area differ between different attack actions, if the same predetermined distance is used for different kinds of attack actions, a gap may be produced between the reference area and the additional area, thereby erroneously determining that the attack action has not hit the enemy character, depending on the attack action (more specifically, depending on the size of the reference area that is set for each kind of the attack action). Therefore, in the present embodiment, the game system 1 sets the predetermined distance so that the reference area partially overlaps with a portion of the additional area that is defined based on the reference area for any of the different kinds of attack actions. Thus, it is possible to prevent the erroneous determination described above.

Figure 15:
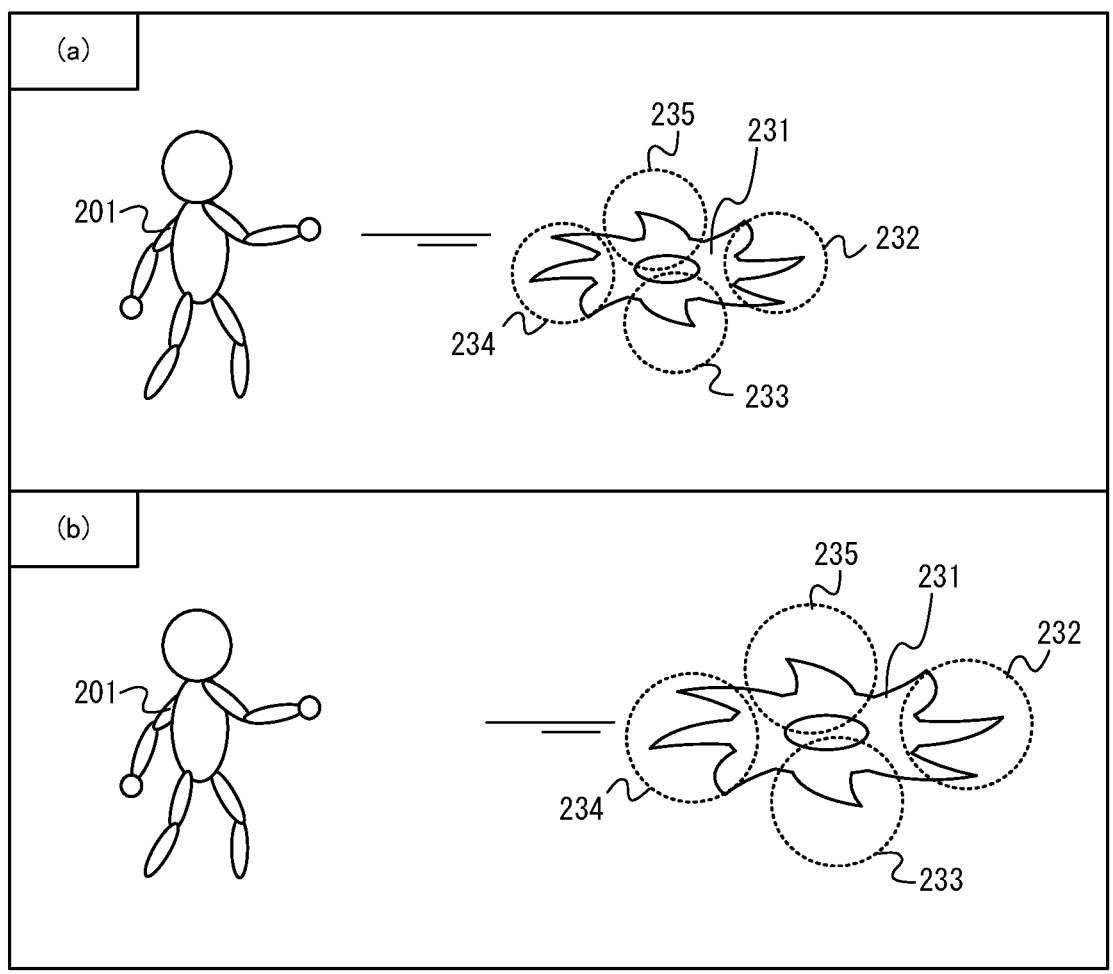
FIG. 15 is a view showing an example of a player character performing a cutter action and the hit detection area that is defined during the action.

FIG. 15 is a view showing an example of the player character performing a cutter action and the hit detection area that is defined during the action. The state (a) shown in FIG. 15 is a state at a point in time after the player character 201 has thrown a cutter object 231, and the state (b) shown in FIG. 12 is a state at a point in time when some time has elapsed since the state (a).

During the cutter action, the cutter object 231 flies, spinning, forward of the player character 201 as shown in FIG. 15, and then returns to the position of the player character 201. The game system 1 defines a plurality of (four in FIG. 15) reference areas 232 to 235 at the position of the cutter object 231. That is, also in the cutter action, as in the other attack actions, the game system 1 defines reference areas based on the position and the orientation of the player character 201 performing the attack action (more specifically, based on the position and the orientation of the cutter object 231 based on the position and the orientation of the player character 201). Note that during the cutter action, the game system 1 defines the four reference areas 232 to 235 simultaneously (i.e., in one frame). In the present embodiment, each reference area in the cutter action is spherical.

As described above, also in the cutter action, as in the hammer action, the reference areas are defined so as to move during the attack action. Note that the reference areas 232 to 235 may or may not be defined to revolve around the center of the cutter object 231 as the cutter object 231 spins.

Note that in the example shown in FIG. 15, while the number of reference areas defined for the cutter object 231 is four for the sake of simplicity of the drawing, more reference areas may be defined in practice so that the reference areas overlap with each other.

In the present embodiment, if a predetermined condition is satisfied (e.g., if the player character 201 has been charged with power for a certain period of time) during the cutter action, the cutter object 231 is enlarged (the state (b) shown in FIG. 15). In this case, the game system 1 enlarges the reference areas 232 to 235 as the cutter object 231 is enlarged. Specifically, the reference areas 232 to 235 are enlarged by the same ratio as the ratio by which the cutter object 231 is enlarged. Thus, in the present embodiment, since the size of the reference areas also changes in response to the change in size of the object of the attack action (herein, the cutter object 231), the extent of the hit detection area can be set to an appropriate extent in accordance with the change in the object.

Figure 16:
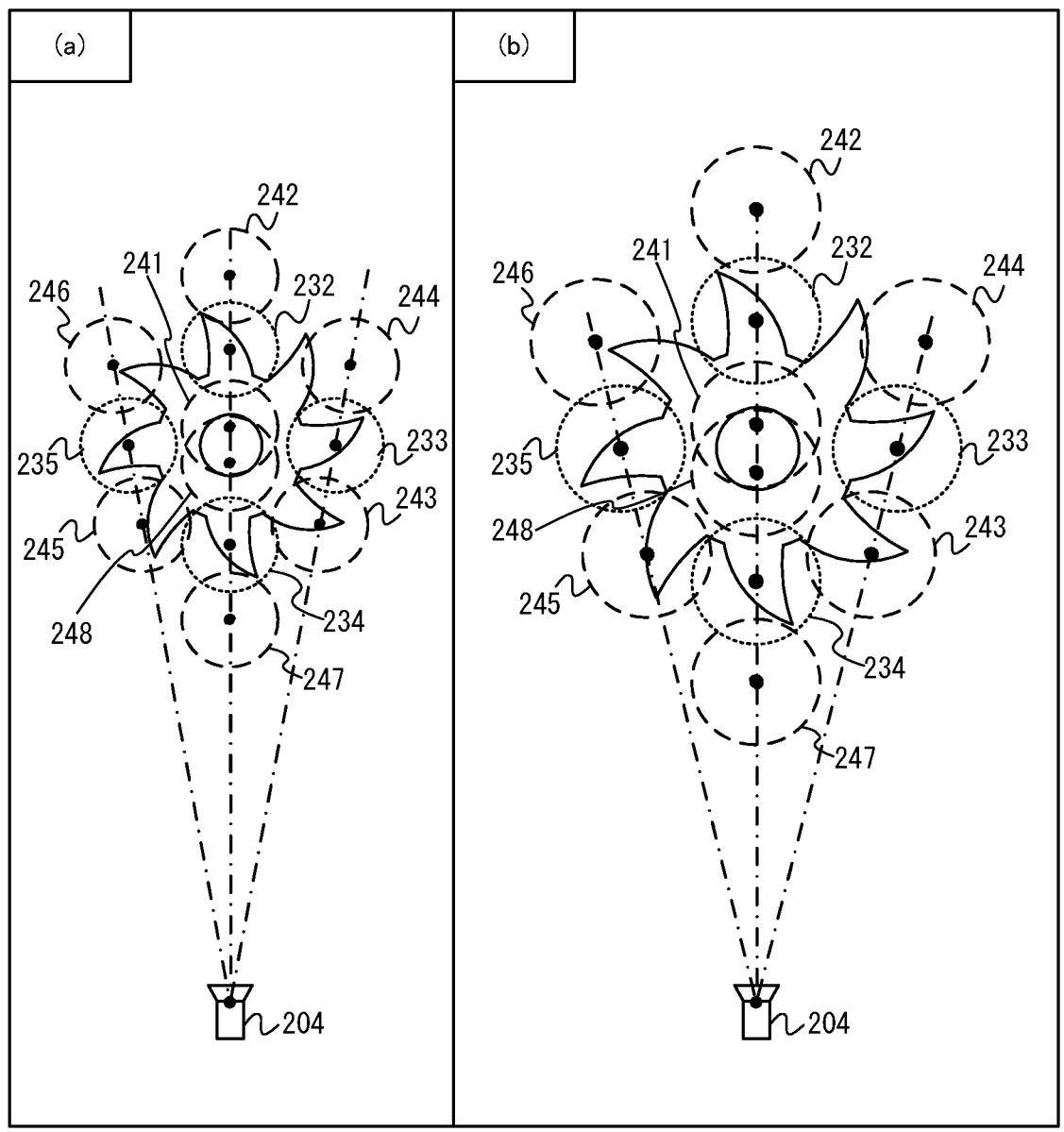
FIG. 16 is a view showing an example of the cutter shown in FIG. 15 and the hit detection area as the game space is viewed from above.

FIG. 16 is a view showing an example of the cutter shown in FIG. 15 and the hit detection area as the game space is viewed from above. The state (a) shown in FIG. 16 is a state at the same point in time as the state (a) shown in FIG. 15, and the state (b) shown in FIG. 16 is a state at the same point in time as the state (b) shown in FIG. 15.

Also in the cutter action, as in the sword action and the hammer action, the game system 1 expands the hit detection area in the depth direction of the virtual camera 204. Specifically, as shown in FIG. 16, the game system 1 defines additional areas 241 to 248 at positions that are shifted from the reference areas 232 to 235, respectively, on the near side and on the far side in the depth direction of the virtual camera 204. Specifically, the game system 1 defines the additional areas 241 to 248 so that the centers of the additional areas 241 to 248 are located on straight lines connecting between the position of the virtual camera 204 and the centers of the reference areas 232 to 235 (see FIG. 16). Note that the size and the shape of the additional areas 241 to 248 are equal to the size and the shape of the reference areas 232 to 235.

When the reference areas 232 to 235 are enlarged as in the state (b) shown in FIG. 16, the additional areas 241 to 248 that are enlarged accordingly are defined. That is, during the cutter action, the game system 1 determines the size of the additional areas 241 to 248 based on the size of the reference areas 232 to 235 at the current time. Then, the additional areas 241 to 248 can be defined in an appropriate size in accordance with the change in size of the cutter object 231.

Note that the distance from the reference area to the additional area (more specifically, the distance from the center of the reference area to the center of the additional area, i.e., the predetermined distance) in the cutter action is equal to that in the sword action and the hammer action. Thus, as the predetermined distance is kept unchanged between different kinds of attack actions, it is possible to reduce the possibility that the positional relationship for the determination that the attack action has hit the enemy character will differ between different attack actions, thereby making the user feel awkward.

While three kinds of attack actions, i.e., the sword action, the hammer action and the cutter action, have been described above, the game system 1 expands the hit detection area also for other attack actions performed by the player character 201. Note however that the game system 1 does not need to expand the hit detection area for all the attack actions performed by the player character 201. For example, for an attack action in which a large number of reference areas are defined, resulting in a large hit detection area, it is possible to easily perform the attack action so as hit the enemy character without expanding the hit detection area, and there is little possibility that the user feels awkward because of the attack action missing the enemy character. Therefore, for such an attack action, the game system 1 does not need to define additional areas (i.e., does not need to expand the hit detection area). Thus, with the game system 1, it is possible to reduce the number of additional areas and to reduce the process load of the hit detection.

In the present embodiment, the enemy character may also perform an attack action (referred to as an "enemy attack action"), and the game system 1 determines whether the enemy attack action has hit the player character 201. The game system 1 uses the hit detection area also for this determination. Note however that in the present embodiment, the hit detection area is not expanded for the enemy attack action. That is, when an enemy attack action by which an enemy character attacks the player character 201 based on a control of the enemy character, the game system 1 defines an enemy hit detection area used for determining whether the enemy attack action has hit the player character based on the position and the orientation of the enemy character in the virtual space, without expanding the enemy hit detection area in the depth direction of the virtual camera 204. Thus, it is possible to reduce the amount of computation for the process of expanding the hit detection area and the hit detection process, thereby reducing the process load of the game system 1. Note that for the enemy attack action, it is believed that there is little possibility that the user feels awkward about the controllability when the attack action does not hit the player character 201 even if the hit detection area is not expanded (because the enemy character is not an object controlled by the user).

If the hit detection area defined for the attack action by the player character 201 is in contact with the enemy character (i.e., if at least a part of the enemy character is included in the hit detection area), the game system 1 determines that the attack action by the player character 201 has hit the enemy character. In this case, the game system 1 executes the process of giving a damage to the enemy character. Here, the process of giving a damage means to include the process of (a) decreasing the value of a parameter representing hit points if such a parameter is set for the enemy character, or (b) knocking down the enemy character that has been hit by the attack action (e.g., the process of making the enemy character fall down and remain still on the ground, or eliminating the enemy character from the game space).

Note that when the hit detection area defined for the attack action by the enemy character is in contact with the player character 201, the game system 1 determines that the attack action by the enemy character has hit the player character

201. In such a case, the game system 1 executes the process of giving a damage to the player character 201.

In the present embodiment, the hit detection area is not displayed. Note however that the game system 1 may display a special effect image of the attack action in at least a part of the hit detection area so that the user can recognize the extent of the hit detection area based on the special effect image.

[3. Specific Example of Process Performed on Game System]

Next, referring to FIG. 17 and FIG. 18, a specific example of an information process performed on the game system 1 will be described.

Figure 17:
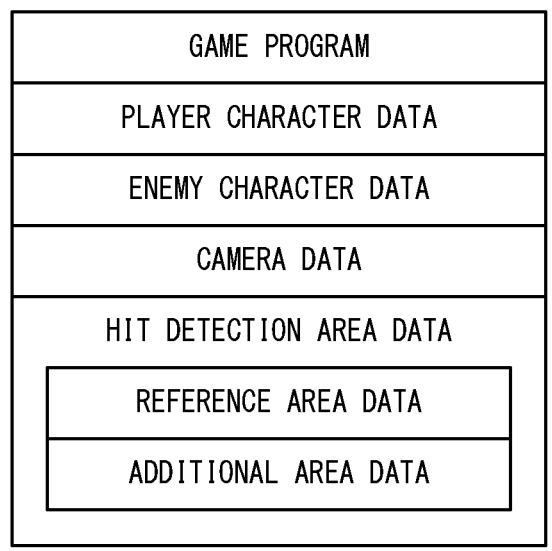
FIG. 17 is a chart showing an example of various data to be used in an information process performed on a non-limiting a game system 1.

FIG. 17 is a chart showing an example of various data to be used in an information process performed on the game system 1. Various data shown in FIG. 17 are stored in a storage medium (e.g., the flash memory 84, the DRAM 85, and/or a memory card in the slot 23) that can be accessed by the main body apparatus 2.

As shown in FIG. 17, the game system 1 stores a game program. The game program is a game program for executing a game process of the present embodiment (specifically, the process shown in FIG. 18). The game system 1 stores the player character data, the enemy character data, the camera data and the hit detection area data.

The player character data represents various information regarding the player character 201. Specifically, the player character data includes data representing the position and the orientation of the player character 201 in the game space. In addition to these data, the player character data may also include data representing a parameter representing the hit points of the player character 201.

The enemy character data represents various information regarding the enemy character. Specifically, the enemy character data includes data representing the position and the orientation of the enemy character in the game space. In addition to these data, the enemy character data may also include data representing a parameter representing the hit points of the enemy character.

The camera data includes data representing the position and the orientation of the virtual camera 204 in the game space. In addition to these data, the camera data may include data representing the angle of view of the virtual camera, etc.

The hit detection area data represents the extent of the hit detection area. In the present embodiment, the hit detection area data includes reference area data and additional area data.

The reference area data represents the extent of the reference area described above. The reference area data may be any data with which the extent of the reference area can be identified. For example, if the reference area is spherical, the reference area data may be data representing the position of the center of the sphere and the radius thereof. If the reference area has a capsule shape as described above, the reference area data may be data representing the position of the center of each of the two spherical unit areas and the radius thereof. If a plurality of reference areas are defined, the reference area data represents the extent of each of the reference areas.

The additional area data represents the extent of the additional area described above. The additional area data may be any data with which the extent of the additional area can be identified. For example, the additional area data, as is the reference area data, may be data representing the position of the center of the spherical additional area or additional unit area and the radius thereof. If a plurality of additional areas are defined, the additional area data represents the extent of each of the additional areas.

Figure 18:
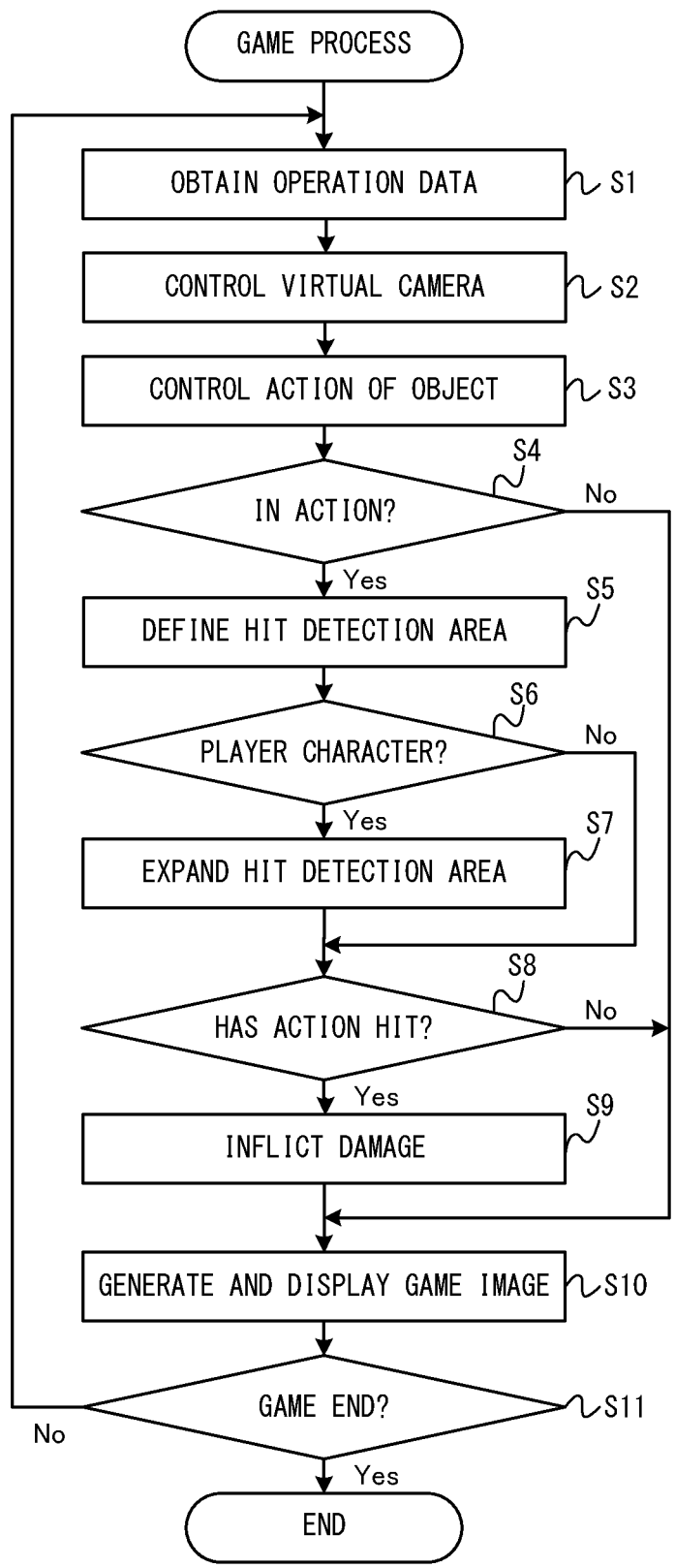
FIG. 18 is a flow chart showing an example of a flow of a game process to be executed by the non-limiting game system 1.

FIG. 18 is a flow chart showing an example of a flow of a game process to be executed by the game system 1. The game process shown in FIG. 18 is started, for example, in response to the player giving an instruction to start the game while the game program described above is being executed.

Note that in the present embodiment, it is assumed that the processor 81 of the main body apparatus 2 executes the processes of the steps shown in FIG. 18 by executing the game program stored in the game system 1. Note however that in other embodiments, some of the processes of the steps may be executed by another processor (e.g., a dedicated circuit) different from the processor 81. When the game system 1 can communicate with another information processing apparatus (e.g., a server), some of the processes of the steps shown in FIG. 18 may be executed on the other information processing apparatus (i.e., the game system 1 may include the other information processing apparatus). The processes of the steps shown in FIG. 18 are merely illustrative, and the order of steps to be performed may be switched around or other processes may be executed in addition to (or instead of) the processes of the steps, as long as similar results are obtained.

The processor 81 executes the processes of the steps shown in FIG. 18 using a memory (e.g., the DRAM 85). That is, the processor 81 stores information (in other words, data) obtained in each process step in the memory, and when the information is used in a subsequent process step, the information is read out from the memory and used.

In step S1 shown in FIG. 18, the processor 81 obtains operation data representing an operation input by the user. That is, the processor 81 obtains, at appropriate points in time, operation data that is received from each controller via the controller communication section 83 and/or the terminals 17 and 21, and stores the operation data in the memory. The process of step S2 is executed, following step S1.

In step S2, the processor 81 controls the virtual camera 204 in the game space. There is no limitation on the specific method for controlling the virtual camera 204. For example, the processor 81 controls the position and the orientation of the virtual camera 204 based on the operation data obtained in step S1. The processor 81 may control the virtual camera 204 based on the position of the player character 201 in addition to (or instead of) controlling the virtual camera 204 based on an operation input by the user. Note that in step S2, the processor 81 updates the camera data stored in the storage medium so as to represent the position and the orientation after the control. The process of step S3 is executed, following step S2.

In step S3, the processor 81 controls the actions of objects (i.e., the player character 201 and enemy characters) in the game space. Specifically, the processor 81 determines a move instruction and an action instruction by the user based on the operation data obtained in step S1. The processor 81 controls the player character 201 to move in the game space based on a move instruction, and controls the player character 201 to perform an attack action in response to an action instruction. The processor 81 controls the enemy characters to move in the game space or perform attack actions based on an algorithm predetermined in the game program. The processor 81 updates the content of the player character data and the enemy character data stored in the storage medium so as to represent the state after being controlled. The process of step S4 is executed, following step S3.

In step S4, the processor 81 determines whether an attack action by the player character 201 or an enemy character is being performed. This determination is performed based on the player character data and the enemy character data stored in the storage medium. If the determination result from step S4 is affirmative, the process of step S5 is executed. On the other hand, if the determination result from step S4 is negative, the process of step S10 is executed, skipping the process of steps S5 to S9.

In step S5, the processor 81 defines the hit detection area for the attack action being currently performed. The hit detection area defined in step S5 is an un-expanded hit detection area (i.e., the reference area). Specifically, the processor 81 defines reference areas in the game space according to the method described in "[2. Outline of process performed on game system]" above. Note that in the present embodiment, the game program includes data in which each attack action is associated with an arrangement pattern of reference areas (e.g., the pattern in which four reference areas are arranged along the path of the sword for the sword action; see FIG. 8). Based on the arrangement pattern, the processor 81 defines reference areas in an arrangement in accordance with the kind of the attack action. The processor 81 updates the content of the reference area data stored in the storage medium so as to represent the defined reference areas. The process of step S6 is executed, following step S5.

In step S6, the processor 81 determines whether the attack action being currently performed is an attack action by the player character 201. This determination is performed based on the player character data and the enemy character data stored in the storage medium. If the determination result from step S6 is affirmative, the process of step S7 is executed. On the other hand, if the determination result from step S6 is negative, (i.e., if an enemy character is performing an attack action), the process of step S8 is executed, skipping the process of step S7 (i.e., the process of expanding the hit detection area). That is, in the present embodiment, the hit detection area is expanded for an attack action by the player character 201, and the hit detection area is not expanded for an attack action by an enemy character.

In step S7, the processor 81 expands the hit detection area defined in step S5. That is, the processor 81 defines additional areas based on the reference areas defined in step S5. Specifically, the processor 81 defines additional area in the game space in accordance with the method described in "[2. Outline of process performed on game system]" above. The processor 81 updates the content of the additional area data stored in the storage medium so as to represent the defined additional areas. The process of step S8 is executed, following step S7.

Here, while the game is played, the process loop of steps S1 to S11 shown in FIG. 18 is repeatedly executed at a rate of once per a predetermined amount of time (specifically, one frame time). Therefore, the process of steps S5 and S7 for defining the hit detection area is started in response to an attack action by the player character 201 being started (i.e., in response to the determination result from step S4 becoming affirmative), and is repeatedly executed during the attack action (i.e., while the determination result from step S4 is affirmative). Therefore, during the attack action, the processor 81 updates the hit detection area (more specifically, reference areas and additional areas) in accordance with passage of time.

As described above, in the present embodiment, the game system 1 starts the control of an attack action by the player character 201 in response to an action instruction by the user (step S3), and defines the hit detection area (more specifically, reference areas and additional areas) based on the position and the orientation of the player character 201 in the game space (steps S5 and S7). For a predetermined period of time after the start of an attack action (i.e., a period of time in which the determination result from step S4 is affirmative), the game system 1 continues to control the attack action by the player character 201 (step S3) and updates the hit detection area in accordance with passage of time (steps S5 and S7). The process of updating the hit detection area is performed by updating the un-expanded hit detection area (i.e., reference areas) in accordance with passage of time based on the pattern associated with the attack action (step S5), and expanding the updated hit detection area in the depth direction of the virtual camera 204 (step S7). Thus, in the present embodiment, the hit detection area is defined continuously during the attack action, thus dynamically expanding the hit detection area. Then, even if the un-expanded hit detection area (i.e., reference areas) changes dynamically, the expansion of the hit detection area can be done precisely in response to changes.

Note that the process of "updating the un-expanded hit detection area in accordance with passage of time" may be a process of changing at least one element of the position, the size and the shape of the hit detection area in accordance with passage of time, or may be a process in which these elements do not change as a result.

In step S8, the processor 81 determines whether the attack action being performed by the player character 201 or an enemy character has hit another object. That is, the processor 81 determines whether the other object is included in the hit detection area defined for the attack action. Note that if the attack action is an action by the player character 201, the hit detection area used for the determination is a hit detection area that is composed of reference areas defined in step S5 and additional areas defined in step S7. On the other hand, if the attack action is an action by an enemy character, the hit detection area used for the determination is the reference areas defined in step S5. The determination of whether the attack action by the player character 201 has hit the other object is performed with reference to the enemy character data and the hit detection area data stored in the storage medium. The determination of whether the attack action by an enemy character has hit the player character 201 is performed with reference to the player character data and the hit detection area data stored in the storage medium. If the determination result from step S8 is affirmative, the process of step S9 is executed. On the other hand, if the determination result from step S8 is negative, the process of step S10 is executed, skipping the process of step S9.

In step S9, the processor 81 executes the process of inflicting a damage to the other object (i.e., the enemy character or the player character 201), which has been hit by the attack action. For example, the processor 81 may decrease the hit points of the other object or eliminate the other object from the game space. Then, the processor 81 updates the content of the player character data or the enemy character data stored in the storage medium so as to reflect the result of the process. The process of step S10 is executed, following step S9.

In step S10, the processor 81 generates, and displays on the display 12, a game image representing the game space in which the process result of steps S2, S3 and S9 has been reflected. Specifically, the processor 81 generates a game image representing the game space as viewed from the position of the virtual camera 204, controlled in step S2, and in the direction of the virtual camera 204, wherein the game image represents how the characters act in accordance with the control by the processes of steps S3 and S9. The generated game image is displayed on the display 12. Note that when the process loop including a series of steps S1 to S11 is executed, the process of step S10 is repeatedly executed at a rate of once per the predetermined amount of time. Thus, a video is displayed, showing how the characters act in the game space. Note that while the game system 1 displays an image on the display 12 in the present embodiment, an image may be displayed on another display device (e.g., a monitor connected to the main body apparatus 2) different from the display 12. The process of step S11 is executed again, following step S10.

In step S11, the processor 81 determines whether or not to end the game. For example, the processor 81 determines whether an instruction to end the game has been given by the user. If the determination result from step S11 is negative, the process of step S1 is executed again. Thereafter, the series of processes of steps S1 to S11 is repeatedly executed until it is determined in step S11 to end the game. On the other hand, if the determination result from step S11 is affirmative, the processor 81 ends the game process shown in FIG. 18.

[4. Functions/Effects and Variations of Present Embodiment]

As described above, in the embodiment described above, the game program is configured to cause a computer of an information processing apparatus (e.g., the main body apparatus 2) to perform the following processes:

controlling a virtual camera in a virtual space (step S2);

controlling movement of a player character in the virtual space in response to a move instruction based on an operation input by a user (step S3);

controlling an action by the player character in the virtual space in response to an action instruction based on the operation input (step S3);

when the player character performs the action, defining, in the virtual space, a hit detection area used for determining whether the action has hit another object other than the player character at a position that is determined based on position and orientation of the player character in the virtual space (step S5), and expanding the hit detection area in a depth direction of the virtual camera (step S7); and if the expanded hit detection area is in contact with the other object, executing a process based on the action against the other object (step S9).

Thus, since the hit detection area is expanded in the depth direction of the virtual camera, even if the position of an object that performs an action and the position of another object are shifted from each other in the depth direction, it is easier to perform the action to hit the other object. Thus, it is possible to improve the controllability of the action.

The "action" for which a hit detection area is defined is an attack action by the player character against an enemy character in the embodiment described above, and it is possible to improve the controllability of the attack action. Here, in other embodiments, the "action" is not limited to an attack action but may be any kind of an action. For example, the game system 1 may define a hit detection area and expand the defined hit detection area in the depth direction of the virtual camera for an action by the player character for obtaining an item placed in the game space, and/or an action for destroying an object placed in the game space.

In the embodiment described above, the hit detection area is defined at the position of a weapon object such as a sword or a hammer to be held by the player character 201. Note however that in other embodiments, the player character 201 does not need to own a weapon object, but the hit detection area may be defined at the position of the player character 201 itself.

The "process based on an action against another object" may be a process to be performed against the other object, and may be any process to be performed based on the action. In the embodiment described above, the "process based on an action against another object" is the process of giving a damage to the other object. In other embodiments, the "process based on an action against another object" may be a process in which an item is obtained by a character that has performed the action in a case where the other object is an item, for example, and may be a process in which the other object is destroyed or deformed in a case where the other object is an object such as a building or an obstruction placed on the ground.

To "expand a hit detection area" means to include any method for expanding the extent of the hit detection area. While the method for expanding the hit detection area is a method in which additional areas to be added to reference areas are also used as the hit detection area in the embodiment described above, the method for expanding the hit detection area is not limited thereto. For example, the hit detection area may be expanded by deforming the hit detection area.

The "expanded hit detection area" refers to an area that includes the original hit detection area and an area that is added by expansion. Specifically, where the hit detection area is expanded by adding additional areas to the basic area as in the embodiment described above, the "expanded hit detection area" refers to an area that includes the original hit detection area (i.e., the basic area) and the additional areas added thereto. Where the hit detection area is expanded by deforming the hit detection area as in the variation to be described below (see FIG. 19), the "expanded hit detection area" refers to the entirety of the deformed hit detection area.

Figure 19:
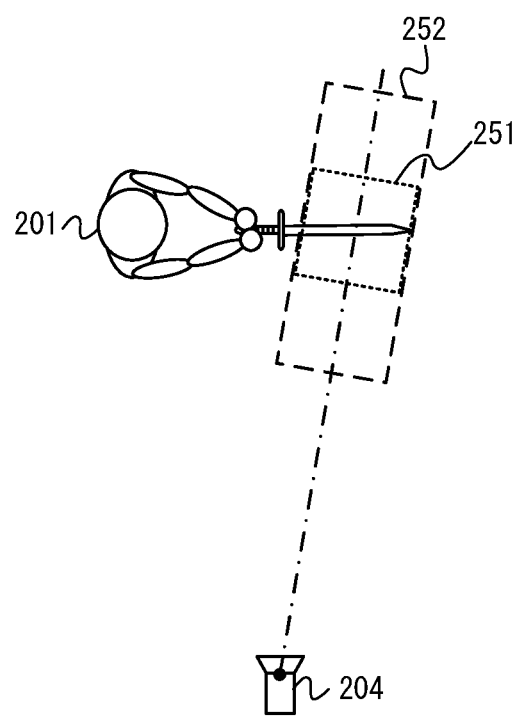
FIG. 19 is a view showing an example of the hit detection area according to a variation of an embodiment.

FIG. 19 is a view showing an example of a hit detection area according to the variation of the embodiment. FIG. 19 shows the hit detection area to be defined when the player character 201 performs a sword action. In the variation shown in FIG. 19, the un-expanded hit detection area 251 is cubic. For example, the cube shape is arranged with one side being parallel to the depth direction of the virtual camera 204.

In the variation shown in FIG. 19, the game system 1 deforms the hit detection area 251 to form an expanded hit detection area 252. That is, the game system 1 expands the hit detection area by deforming the hit detection area 251 to as to enlarge the hit detection area 251 in the depth direction of the virtual camera 204. Thus, it is possible to expand the hit detection area as in the embodiment described above.

Note that while the example shown in FIG. 19 is directed to a case where a cubic hit detection area is deformed, the game system 1 may deform a spherical hit detection area. For example, the game system 1 may deform a spherical hit detection area into an elliptical sphere so as to expand the hit detection area in the depth direction of the virtual camera 204.

Note that in other embodiments, the information processing system (i.e., the game system 1) does not need to include some of the components of the embodiment described above and does not need to execute some of the processes that are executed in the embodiment described above. For example, in order to realize a specific one of the advantageous effects of the embodiment described above, the information processing system may include a component or components for realizing the specific advantageous effect and execute a process or processes for realizing the specific advantageous effect, and the information processing system does not need to include other components and does not need to execute other processes.

The embodiment described above can be used in, for example, a game system or a game program, etc., with the aim of making it easier to perform an action to hit an object, for example.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a game program, wherein when executed the game program causes a processor of an information processing apparatus to:
    control a virtual camera in a virtual space;
    control movement of a player character object in the virtual space in response to a move instruction based on an operation input by a user;
    control an action by the player character object in the virtual space in response to an action instruction based on the operation input;
    when the player character object performs the action, define a hit detection area used for determining whether the action has hit another object other than the player character object at a position that is determined based on position and orientation of the player character object in the virtual space, and expand the hit detection area in a depth direction of the virtual camera in the virtual space; and
    if the expanded hit detection area is in contact with the other object, perform a process based on the action against the other object.

2. The storage medium according to claim 1, wherein:
    the hit detection area is a plurality of areas of a predetermined shape that are arranged in a predetermined positional relationship; and
    the game program when executed further causes the processor to expand the hit detection area by adding, to at least one of the plurality of areas, an area of the same shape as the at least one area at a position that is shifted by a predetermined amount in the depth direction of the virtual camera.

3. The storage medium according to claim 2, wherein the game program when executed further causes the processor to expand the hit detection area by adding, to at least one of the plurality of areas, an area on a near side thereof in the depth direction of the virtual camera and an area on a far side thereof in the depth direction of the virtual camera.

4. The storage medium according to claim 1, wherein:
    the hit detection area is a plurality of areas of a predetermined shape that are arranged in a predetermined positional relationship; and
    the game program when executed further causes the processor to expand the hit detection area by moving at least one of the plurality of areas in the depth direction of the virtual camera.

5. The storage medium according to claim 1, wherein the game program when executed further causes the processor to expand the hit detection area by deforming the hit detection area so as to enlarge the hit detection area in the depth direction of the virtual camera.

6. The storage medium according to claim 1, wherein the hit detection area has a spherical shape.

7. The storage medium according to claim 1, wherein the hit detection area has a shape that includes a first unit area and a second unit area that are arranged in a predetermined positional relationship, and a connecting area that connects together the first unit area and the second unit area by a predetermined rule.

8. The storage medium according to claim 1, wherein:
    the game program when executed further causes the processor to:
        in response to the action instruction, start a control of the action by the player character object, and define the hit detection area based on position and orientation of the player character object in the virtual space; and
        for a predetermined period of time after the start of the action, continue the control of the action by the player character object, and update the hit detection area in accordance with passage of time; and
    updating the hit detection area in accordance with passage of time is done by updating the hit detection area in accordance with passage of time based on a pattern that is associated with the action, and expanding the updated hit detection area in the depth direction of the virtual camera.

9. The storage medium according to claim 1, wherein:
    the other object is an enemy character object;
    the predetermined action is an attack action; and
    the process based on the action is a process of giving a damage to the enemy character object.

10. The storage medium according to claim 9, wherein the game program when executed further causes the processor to further:
    control the enemy character object in the virtual space;
    if an enemy attack action is performed in which the enemy character object attacks the player character object based on the control of the enemy character object, define an enemy hit detection area used for determining whether the enemy attack action has hit the player character object based on position and orientation of the enemy character object in the virtual space, without expanding the enemy hit detection area in the depth direction of the virtual camera; and
    if the enemy hit detection area is in contact with the player character object, perform a process of giving a damage to the player character object.

11. An information processing apparatus comprising a processor and a memory coupled thereto, wherein:
    the processor is configured to:
        control a virtual camera in a virtual space;
        control movement of a player character object in the virtual space in response to a move instruction based on an operation input by a user;
        control an action by the player character object in the virtual space in response to an action instruction based on the operation input;
        when the player character object performs the action, define, in the virtual space, a hit detection area used for determining whether the action has hit another object other than the player character object at a position that is determined based on position and orientation of the player character object in the virtual space, and expand the hit detection area in a depth direction of the virtual camera in the virtual space; and if the expanded hit detection area is in contact with the other object, perform a process based on the action against the other object.

12. The information processing apparatus according to claim 11, wherein:
the hit detection area is a plurality of areas of a predetermined shape that are arranged in a predetermined positional relationship; and
the processor is configured to expand the hit detection area by adding, to at least one of the plurality of areas, an area of the same shape as the at least one area at a position that is shifted by a predetermined amount in the depth direction of the virtual camera.

13. The information processing apparatus according to claim 12, wherein the processor is configured to expand the hit detection area by adding, to at least one of the plurality of areas, an area on a near side thereof in the depth direction of the virtual camera and an area on a far side thereof in the depth direction of the virtual camera.

14. The information processing apparatus according to claim 11, wherein:
the hit detection area is a plurality of areas of a predetermined shape that are arranged in a predetermined positional relationship; and
the processor is configured to expand the hit detection area by moving at least one of the plurality of areas in the depth direction of the virtual camera.

15. The information processing apparatus according to claim 11, wherein the processor is configured to expand the hit detection area by deforming the hit detection area so as to enlarge the hit detection area in the depth direction of the virtual camera.

16. The information processing apparatus according to claim 11, wherein the hit detection area has a spherical shape.

17. The information processing apparatus according to claim 11, wherein the hit detection area has a shape that includes a first unit area and a second unit area that are arranged in a predetermined positional relationship, and a connecting area that connects together the first unit area and the second unit area by a predetermined rule.

18. The information processing apparatus according to claim 11, wherein:
the processor is configured to:
in response to the action instruction, start a control of the action by the player character object, and define the hit detection area based on position and orientation of the player character object in the virtual space; and
for a predetermined period of time after the start of the action, continue the control of the action by the player character object, and update the hit detection area in accordance with passage of time; and
updating the hit detection area in accordance with passage of time is done by updating the hit detection area in accordance with passage of time based on a pattern that is associated with the action, and expanding the updated hit detection area in the depth direction of the virtual camera.

19. The information processing apparatus according to claim 11, wherein:
the other object is an enemy character object;
the predetermined action is an attack action; and
the process based on the action is a process of giving a damage to the enemy character object.

20. The information processing apparatus according to claim 19, wherein the processor is further configured to:
control the enemy character object in the virtual space;
if an enemy attack action is performed in which the enemy character object attacks the player character object based on the control of the enemy character object, define an enemy hit detection area used for determining whether the enemy attack action has hit the player character object based on position and orientation of the enemy character object in the virtual space, without expanding the enemy hit detection area in the depth direction of the virtual camera; and
if the enemy hit detection area is in contact with the player character object, perform a process of giving a damage to the player character object.

21. An information processing system comprising a processor and a storage medium having stored therein a game program, wherein:
the processor is configured to execute the game program to:
control a virtual camera in a virtual space;
control movement of a player character object in the virtual space in response to a move instruction based on an operation input by a user;
control an action by the player character object in the virtual space in response to an action instruction based on the operation input;
when the player character object performs the action, define, in the virtual space, a hit detection area used for determining whether the action has hit another object other than the player character object at a position that is determined based on position and orientation of the player character object in the virtual space, and expand the hit detection area in a depth direction of the virtual camera in the virtual space; and
if the expanded hit detection area is in contact with the other object, perform a process based on the action against the other object.

22. The information processing system according to claim 21, wherein:
the hit detection area is a plurality of areas of a predetermined shape that are arranged in a predetermined positional relationship; and
the processor is configured to expand the hit detection area by adding, to at least one of the plurality of areas, an area of the same shape as the at least one area at a position that is shifted by a predetermined amount in the depth direction of the virtual camera.

23. The information processing system according to claim 22, wherein the processor is configured to expand the hit detection area by adding, to at least one of the plurality of areas, an area on a near side thereof in the depth direction of the virtual camera and an area on a far side thereof in the depth direction of the virtual camera.

24. The information processing system according to claim 21, wherein:
the hit detection area is a plurality of areas of a predetermined shape that are arranged in a predetermined positional relationship; and
the processor is configured to expand the hit detection area by moving at least one of the plurality of areas in the depth direction of the virtual camera.

25. The information processing system according to claim 21, wherein the processor is configured to expand the hit detection area by deforming the hit detection area so as to enlarge the hit detection area in the depth direction of the virtual camera.

26. The information processing system according to claim 21, wherein the hit detection area has a spherical shape.

27. The information processing system according to claim 21, wherein the hit detection area has a shape that includes a first unit area and a second unit area that are arranged in a predetermined positional relationship, and a connecting area that connects together the first unit area and the second unit area by a predetermined rule.

28. The information processing system according to claim 21, wherein:
the processor is configured to:
in response to the action instruction, start a control of the action by the player character object, and define the hit detection area based on position and orientation of the player character object in the virtual space; and
for a predetermined period of time after the start of the action, continue the control of the action by the player character object, and update the hit detection area in accordance with passage of time; and
updating the hit detection area in accordance with passage of time is done by updating the hit detection area in accordance with passage of time based on a pattern that is associated with the action, and expanding the updated hit detection area in the depth direction of the virtual camera.

29. The information processing system according to claim 21, wherein:
the other object is an enemy character object;
the predetermined action is an attack action; and
the process based on the action is a process of giving a damage to the enemy character object.

30. The information processing system according to claim 29, wherein:
the processor is further configured to:
control the enemy character object in the virtual space;
if an enemy attack action is performed in which the enemy character object attacks the player character object based on the control of the enemy character object, define an enemy hit detection area used for determining whether the enemy attack action has hit the player character object based on position and orientation of the enemy character object in the virtual space, without expanding the enemy hit detection area in the depth direction of the virtual camera; and
if the enemy hit detection area is in contact with the player character object, perform a process of giving a damage to the player character object.

31. A game processing method to be executed by an information processing system, the method comprising:
controlling a virtual camera in a virtual space;
controlling movement of a player character object in the virtual space in response to a move instruction based on an operation input by a user;
controlling an action by the player character object in the virtual space in response to an action instruction based on the operation input;
when the player character object performs the action, defining, in the virtual space, a hit detection area used for determining whether the action has hit another object other than the player character object at a position that is determined based on position and orientation of the player character object in the virtual space, and expand the hit detection area in a depth direction of the virtual camera in the virtual space; and
if the expanded hit detection area is in contact with the other object, performing a process based on the action against the other object.

32. The game processing method according to claim 31, wherein:
the hit detection area is a plurality of areas of a predetermined shape that are arranged in a predetermined positional relationship; and
further comprising expanding the hit detection area by adding, to at least one of the plurality of areas, an area of the same shape as the at least one area at a position that is shifted by a predetermined amount in the depth direction of the virtual camera.

33. The game processing method according to claim 32, further comprising expanding the hit detection area by adding, to at least one of the plurality of areas, an area on a near side thereof in the depth direction of the virtual camera and an area on a far side thereof in the depth direction of the virtual camera.

34. The game processing method according to claim 31, wherein:
the hit detection area is a plurality of areas of a predetermined shape that are arranged in a predetermined positional relationship; and
further comprising expanding the hit detection area by moving at least one of the plurality of areas in the depth direction of the virtual camera.

35. The game processing method according to claim 31, further comprising expanding the hit detection area by deforming the hit detection area so as to enlarge the hit detection area in the depth direction of the virtual camera.

36. The game processing method according to claim 31, wherein the hit detection area has a spherical shape.

37. The game processing method according to claim 31, wherein the hit detection area has a shape that includes a first unit area and a second unit area that are arranged in a predetermined positional relationship, and a connecting area that connects together the first unit area and the second unit area by a predetermined rule.

38. The game processing method according to claim 31, further comprising:
in response to the action instruction, starting a control of the action by the player character object, and defining the hit detection area based on position and orientation of the player character object in the virtual space; and
for a predetermined period of time after the start of the action, continuing the control of the action by the player character object, and updating the hit detection area in accordance with passage of time; and
wherein updating the hit detection area in accordance with passage of time is done by updating the hit detection area in accordance with passage of time based on a pattern that is associated with the action, and expanding the updated hit detection area in the depth direction of the virtual camera.

39. The game processing method according to claim 31, wherein:
the other object is an enemy character object;
the predetermined action is an attack action; and
the process based on the action is a process of giving a damage to the enemy character object.

40. The game processing method according to claim 39, further comprising:
controlling the enemy character object in the virtual space;
if an enemy attack action is performed in which the enemy character object attacks the player character object based on the control of the enemy character object, defining an enemy hit detection area used for determining whether the enemy attack action has hit the player character object based on position and orientation of the enemy character object in the virtual space, without expanding the enemy hit detection area in the depth direction of the virtual camera; and if the enemy hit detection area is in contact with the player character object, performing a process of giving a damage to the player character object.

* * * * *